United States Patent
Pathuri et al.

(10) Patent No.: US 10,231,268 B2
(45) Date of Patent: Mar. 12, 2019

(54) ASSOCIATING DEVICES AND USERS WITH A LOCAL AREA NETWORK USING NETWORK IDENTIFIERS

(71) Applicant: Belkin International, Inc., Playa Vista, CA (US)

(72) Inventors: Venkata Subba Rao Pathuri, Alpharetta, GA (US); Ryan Yong Kim, Rolling Hills Estates, CA (US); Gursharan Sidhu, Moorpark, CA (US); Naga Yerramsetti, Houston, TX (US); Jimmy Chung, Lakewood, CA (US); Brian Knopf, Woodland Hills, CA (US)

(73) Assignee: Belkin International, Inc., Playa Vista, CA (US)

( * ) Notice: Subject to any disclaimer, the term of this patent is extended or adjusted under 35 U.S.C. 154(b) by 305 days.

(21) Appl. No.: 14/959,192

(22) Filed: Dec. 4, 2015

(65) Prior Publication Data

US 2016/0165651 A1   Jun. 9, 2016

Related U.S. Application Data

(60) Provisional application No. 62/087,458, filed on Dec. 4, 2014, provisional application No. 62/088,460, filed on Dec. 5, 2014.

(51) Int. Cl.
| | | |
|---|---|---|
| *H04W 76/11* | (2018.01) | |
| *H04W 8/26* | (2009.01) | |
| *H04W 84/12* | (2009.01) | |
| *H04W 8/22* | (2009.01) | |

(52) U.S. Cl.
CPC ............. *H04W 76/11* (2018.02); *H04W 8/26* (2013.01); *H04W 8/22* (2013.01); *H04W 84/12* (2013.01)

(58) Field of Classification Search
CPC ....... H04W 76/021; H04W 8/26; H04W 8/22; H04W 84/12
See application file for complete search history.

(56) References Cited

U.S. PATENT DOCUMENTS

2014/0282967 A1*  9/2014  Maguire ............... H04W 36/18
                                                          726/7
2015/0127733 A1*  5/2015  Ding ........................ H04W 4/08
                                                          709/204

* cited by examiner

*Primary Examiner* — Jackie Zuniga Abad
(74) *Attorney, Agent, or Firm* — Kilpatrick Townsend & Stockton LLP

(57) ABSTRACT

Techniques for associating devices and users with a local area network using network identifiers are provided. For example, a method, system, and computer-program product for associating network devices with a local area network using a network identifier are provided. For example, a method may include receiving, at a computing device, a communication including a unique identifier for a network device connected to a network. The method may further include using the unique identifier to determine properties of the network device and generating a network identifier for the network, wherein the network identifier includes an indication of a time at which the network identifier is generated, an indication of the computing device, and an indication of the network device properties. The method can also include transmitting the network identifier, wherein when the network identifier is received, the network identifier facilitates identifying the network and associating the network device with the network.

20 Claims, 22 Drawing Sheets

ASSOCIATING DEVICES AND USERS WITH A LOCAL AREA NETWORK USING NETWORK IDENTIFIERS

CROSS-REFERENCE TO RELATED APPLICATIONS

The present application claims the benefit of and priority to U.S. Provisional Application No. 62/087,458, filed Dec. 4, 2014; and U.S. Provisional Application No. 62/088,460, filed Dec. 5, 2014, the entire contents of which are incorporated herein by reference for all purposes.

TECHNICAL FIELD

The present disclosure relates to identifying networks and configuring network devices. Specifically, various techniques and systems are provided for network fingerprinting and using network fingerprints to infer that network devices and their users are associated with the same network and with each other. Systems and methods for configuring network devices are also provided.

BACKGROUND

Multiple devices may be present within a local area network. For example, a user's home local area network may include devices that are persistently connected, such as a router, a gateway, a range extender, a Set Top Box (STB), a media server, and a network-attached storage (NAS) device. Some other network devices are typically connected most of the time (e.g., desktop computers, connected/smart TVs, etc.). Other network devices are connected to the network some of the time (e.g., smart phones belonging to residents of a home associated with the network, tablet devices, laptops, etc.). Yet other network devices are seldom connected (e.g., guest devices). Network devices that provide various functionalities may also be present within the local area network. For example, a home automation network device may provide a user with the ability to remotely configure or control one or more appliances within the user's home. A local area network may be assigned a network profile or logical network identifier based on a gateway that provides network access to one or more access devices and network devices connected to the network. A network profile may change as a result of devices being connected to and disconnected from the network. As new devices are discovered, they may only be able to connect to one network at a time, and thus the existence of multiple network profiles or logical network identifiers may prevent a user from accessing all of the network devices within the network.

BRIEF SUMMARY

Techniques are described for using unique network identifiers to associate devices and users with a network. For example, a computing device may receive a communication including a unique identifier for a network device connected to a network. The device, upon receiving the communication, may use the unique identifier to determine properties of the network device, and then generate a network identifier for the network, wherein the network identifier includes an indication of a time at which the network identifier is generated, an indication of the computing device, and an indication of the network device properties. The method can also include transmitting the network identifier, wherein when the network identifier is received, the network identifier facilitates identifying the network and associating the network device with the network.

According to at least one example, the unique identifier is a hardware address of the network device. For example, the hardware address can be a media access control (MAC) address of the network device.

In accordance with embodiments, the network device properties can include a device type, a device manufacturer, or a logical name of the device.

According to at least one example, when the network identifier is received, the network identifier facilitates determining changes to the network over time, wherein determining the changes includes comparing the network identifier to one or more previously transmitted network identifiers.

In one embodiment, when the network identifier is received at a cloud-based service, the network identifier facilitates registering the network device with the cloud-based service.

In some embodiments, a system may be provided that includes one or more data processors. The system may further include a memory having instructions stored thereon, which when executed by the one or more data processors, cause the one or more data processors to perform operations including: receiving, at a computing device, a communication including a unique identifier for a network device connected to a network; using the unique identifier to determine properties of the network device; generating a network identifier for the network, wherein the network identifier includes an indication of a time at which the network identifier is generated, the computing device, and the properties of the network device; and transmitting the network identifier, wherein when the network identifier is received, the network identifier is usable to uniquely identify the network and to associate the network device with the network.

In other embodiments, a computer-program product may be provided. The computer-program product may be tangibly embodied in a non-transitory machine-readable storage medium. The machine-readable storage medium may include instructions configured to cause a data processing apparatus to: receive a communication including a unique identifier for a network device connected to a network; use the unique identifier to determine properties of the network device; generate a network identifier for the network, wherein the network identifier includes an indication of a time at which the network identifier is generated, the data processing apparatus, and the properties of the network device; and transmit the network identifier, wherein when the network identifier is received, the network identifier is usable to uniquely identify the network and to associate the network device with the network.

In some embodiments, the method, system, and computer-program product described above may further include determining a transience level of the network device based on the network device properties, and assigning a weight to the network device based on the transience level, wherein the network identifier includes an indication of the weight.

In some embodiments, the method, system, and computer-program product described above may further include: obtaining additional unique identifiers, wherein each additional unique identifier is associated with an additional network device connected to the network; using the additional unique identifiers to determine properties for each of the additional network devices; and then updating the network identifier to include an indication of the properties of the additional network devices.

In some embodiments, the method, system, and computer-program product described above may further include periodically polling the network to determine a change in the network, wherein the change includes a connection of a new network device, a disconnection of an additional network device, or a change in a gateway in the network, and then updating the network identifier.

The present disclosure also relates to the configuration of network devices using a direct communications link between network devices. A network device is configured with, for example, wireless network access information (e.g., SSID name, SSID password, network device username, and/or network device password), and that configuration information is stored on the network device. Communication is facilitated between the network device and other network devices by establishing a direct communications link. Once the direct communications link is established, the configuration information is transmitted from the network device to other network devices using the direct communications link.

According to some embodiments, a system is provided comprising one or more data processors, and a non-transitory computer-readable storage medium containing instructions which when executed on the one or more data processors, cause the one or more data processors to perform the above operations. In other embodiments, a computer-program product is provided that is tangibly embodied in a non-transitory machine-readable storage medium, including instructions configured to cause a data processing apparatus to perform the above operations for configuring network devices.

Thus, multiple network devices may be quickly and easily configured with wireless network access information according to some embodiments. A configured network device must only be brought within direct communication range of other, unconfigured network devices in order to configure those network devices with the same configuration information. Once the network devices are configured, they may then be used to configure still other network devices.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures.

Illustrative embodiments of the present invention are described in detail below with reference to the following drawing figures.

DETAILED DESCRIPTION

Figure 1:
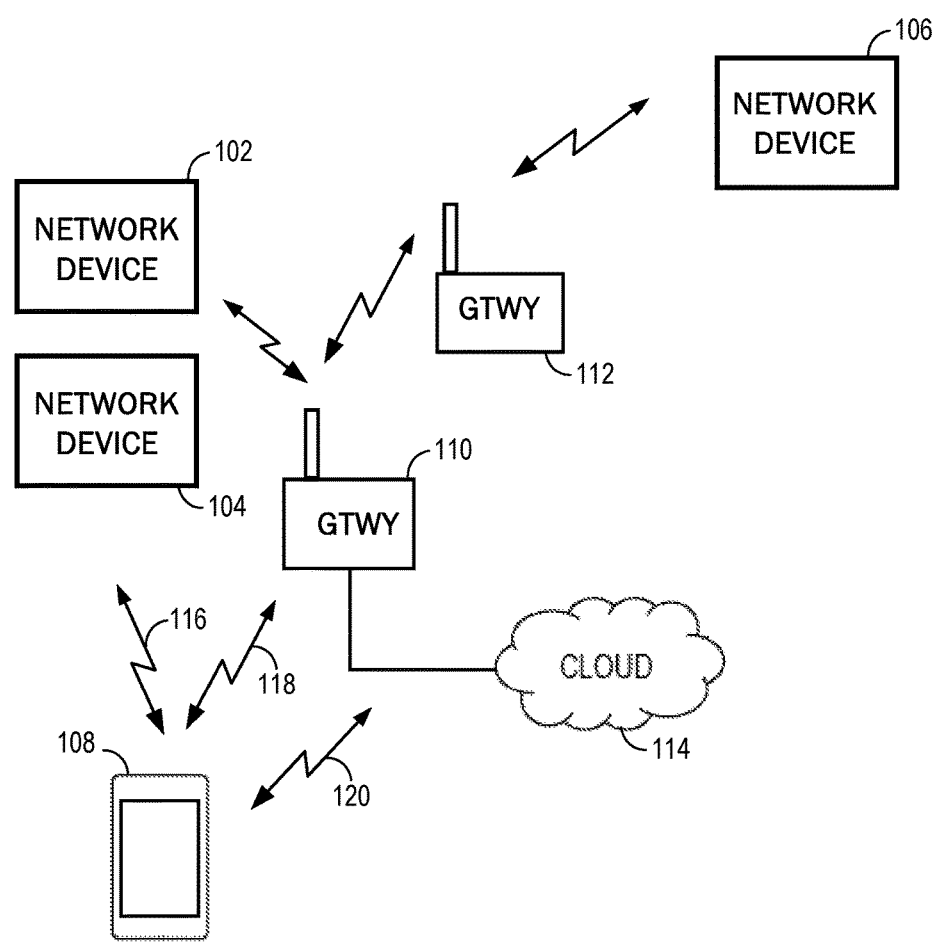
FIG. 1 is an illustration of an example of a network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network. As explained herein, techniques are provided that allow generation of a network identifier (e.g., a network fingerprint) identifying a local area network, thus facilitating associating multiple network devices and users with the local area network. These techniques allow a user, whether located locally or remotely from the local area network, to access all network devices in the local area network.

Techniques are described for determining a network device's current network without requiring user input such as login or account credentials. The techniques may include creating a snapshot of a network fingerprint, reporting a current network fingerprint, and implementing rules based on the current network. An enhanced network fingerprinting mechanism is described that relies on the normal transient resonance of connected devices within a network to uniquely identify a network. A network fingerprint or signature is generated that enables identification of a unique network from any other network. A network can have multiple network devices that are connected to the network at any given time. Some of these network devices are 'persistent' devices that are connected to the network almost all of the time (e.g., Set Top Boxes/STBs, Media Servers, network-attached storage (NAS) devices, connected light bulbs, etc.). Some other network devices are typically connected most of the time (e.g., desktop computers, connected/ smart TVs, etc.). Yet other network devices some are connected to the network some of the time (e.g., Smart Phones used by or belonging to residents of a site associated with the network, tablet devices, laptops, etc.), and some other network devices are seldom connected (e.g., guest devices). A network device can be an internet of things (IoT) device. Based on learning and recording these 'transient resonances' of these specific network devices with specific media access control (MAC) addresses, techniques described herein can fingerprint a specific network with high accuracy. A local area network may be assigned a unique network identifier based on devices connected to it. A network profile can be associated with a unique network identifier. Accordingly, multiple, different network identifiers may be associated with a network due to new devices being connected to the network.

Techniques are described for creating network identifiers such as network signatures or fingerprints. The techniques can employ active or passive collection of configuration attributes and properties from connected network devices, gateways, and access devices. The attributes can be actively reported by the connected devices and gateways during network communications. For example, a server can poll the network for the attributes and properties. The attributes and properties can also be passively collected as part of a discovery process for the network devices and the access devices. The discovery process can include using a unique identifier provided or communicated by connected devices to determine attributes of the devices. The attributes may then be incorporated into a network fingerprint. The attribute values may be combined with a timestamp to form a network signature, or fingerprint, for the network.

Techniques are described for network fingerprinting using media access control (MAC) behaviors. The techniques create network identifiers reflecting network devices connected to wireless and wired networks. The network identifier can be a network fingerprint reflecting properties of a gateway. The gateway properties may include a service set identification (SSID) of the home local area network, a media access control (MAC) address of the gateway, and/or the like. The network device may transmit its unique identifier to a server, such as a cloud network server. In some embodiments, the unique identifier sent by the network device may be used to determine information relating to the network device (e.g., MAC address, serial number, or the like), and an access device may send its own unique identifier that can be used to determine information relating to the access device (e.g., MAC address, serial number, application unique identifier, or the like).

The network identifier can reflect network devices that have not previously been seen by an application on the access device. In some examples, a server may determine properties for a plurality of network devices connected to a home local area network. The plurality of network devices may include devices that have previously been seen by the application on the access device, as well as network devices that have not previously been seen. In one example, a network identifier (e.g., a network fingerprint) is created that reflects properties of each of the connected network devices that are accessible using application executing on an access device. In other examples, the network identifier is defined based on all network devices, access devices, gateways, range extenders, and other devices connected to the network. Such connected devices can include wearable devices, embedded devices, ambient sensors, and other devices having communications capabilities usable to communicate via the network. A network device whose properties are reflected in a network fingerprint may be a newly discovered network device. The network device can be a relatively stationary device such as, for example, a network gateway, a personal computer, a connected television (i.e., a smart TV), or a touchscreen device mounted on a wall or other surface (i.e., a touchscreen integrated into the door of a refrigerator or another appliance). For example, a home local area network may include a gateway connected to a discovered network device. The server may determine that a network device is associated with a known network, and thus that the device key for the network device needs to be provided to the gateway and/or an access device that is also associated with the network. For example, the server may determine the existence of multiple device keys corresponding to respective network devices based on communications from the network devices and/or communication from a mobile device that is associated with the network. Upon discovering a network device that is connected to a home local area network, the server may receive a unique ID for the network device, use the unique ID to determine properties for the network device, and generate a network identifier that reflects the network device's properties as well as respective properties of the mobile device and the gateway.

In certain embodiments, a network device may have a unique identifier assigned to it. For example, hardware address for the network device may be uploaded to the server, added to a device registry associated with a network, and evaluated to determine device properties. According to these embodiments, a network identifier is generated that includes indications of the time the identifier was created, an indication of the network device, and indications of access devices and other network devices associated with the network. For example, the network identifier may be embodied as a network fingerprint that reflects a timestamp when the fingerprint was created, the network device, its properties, and identities and properties of other network devices that were previously discovered, registered, and uploaded to a device registration and discovery service hosted on the server. The server may then transmit the network fingerprint to an access device associated with the home local area network. Once received by the access device, the network fingerprint is usable to determine that network devices are associated with the same network. For example, the network fingerprint may also be usable to determine that different users are associated with the same network. Accordingly, a network identifier can include an indication of a newly discovered network device and can be transmitted to a server so that the network identifier can be used to authenticate the network device to the network and associate the network device with the network, regardless of whether the network device has previously been connected to or associated with the network or another network device connected to the network.

In some examples, network devices may send respective communications to a server indicating that they are connected to a local area network. For example, a first network device may send a first unique identifier and a second network device may send a second unique identifier to the server. The server can use the unique identifiers to determine respective properties of each of the network devices and use the properties to generate a snapshot of a fingerprint for the network that indicates the time at which the snapshot was taken. A mobile device may subsequently discover the first and second network devices, and compare one or more previous snapshots of the network fingerprint with a current network fingerprint snapshot to determine that the network devices are associated with the same network, and then authenticate the network devices to the network based on the snapshot comparison.

In an example, the first and second unique identifiers are the respective hardware addresses of the first and second network device. The hardware addresses can be used to determine or infer respective properties of first and second network devices. For example, in embodiments where the hardware addresses are MAC addresses, portions or substrings of the MAC addresses can be used to determine a manufacturer, device type, a transience level, and logical name for each network device connected to a network. These and other properties can then be used to create a network identifier (e.g., a network fingerprint) for the network. In one embodiment, the network identifier can include a hash value that is generated by executing a cryptographic hash function.

In some embodiments, transient devices, such as, for example, certain mobile network devices and access devices, are assigned lower weights than more permanent devices, such as, for example, gateways, routers, televisions, appliances (e.g., refrigerators, washing machines, dryers, dishwashers, air conditioners and other large appliances), embedded devices, and game consoles. By assigning such lower weights to more transient devices, discovery and rediscovery of such transient devices will have less impact on the overall network fingerprint than discovery and rediscovery of more permanent devices. For instance, periodic or temporary disconnections and reconnections of transient devices such as smartphones, tablets, laptops, and portable gaming devices may be reflected in a network fingerprint, but due to the relatively low weight assigned to these devices, the fingerprint will not be impacted as greatly as when a more permanent device such as a smart television is connected to or disconnected from the network. For example, a tablet device may exhibit usage patterns of being disconnected from a local area network for several hours each weekday (e.g., while being used on another, remote network such as a work or school network). Similarly, an access device may exhibit patterns of being disconnected from a local area network each weekday morning and being re-connected to the local area network each evening. Patterns over time can be identified and factored into weights for such transient devices. In this way, network fingerprints for a given network may be considered to be substantially identical when their only differences are the connectivity status of transient devices. That is, fingerprints over time can be compared and evaluated as having only negligible differences or insignificant changes when transient devices are disconnected from and re-connected to a network. The network fingerprints can be compared over time to determine whether changes in a network are significant or not. If enough, significant differences in fingerprints are identified, such as, for example, the presence of different permanent devices and different gateways and routers, the comparisons can determine that the networks being compared are different networks.

In some examples, respective properties of network devices connected to a local area network are reflected in a network identifier for that network. For example, a unique identifier of a network device connected to a local area network can be analyzed to determine the device's manufacturer, logical name, transience level, and other properties. The network identifier can be compared to other network identifiers created over time to associate a user and/or a network device with a local area network. By using such network identifiers (e.g., network fingerprints), a user that has not previously been associated with a network, but who is using an access device previously connected to the network, can be authenticated to the network. Similarly, network fingerprints created at different points in time can be compared to associate devices with a local area network. For example, when an access device that is being used by a user who has been previously authenticated to the network is connected to a network for the first time, that device can be associated with the network based on the user's other devices being reflected in prior fingerprints of the network.

In some embodiments, an accountless authentication process may be performed so that the user can access one or more network devices within a local area network without having to enter network device login credentials each time access is requested. While located locally within the local area network, an access device may be authenticated based on the access device's authentication with the local area network, which is identified using a network fingerprint. For example, if the access device has authorized access to the local area network (e.g., a WiFi network provided by a gateway), the network devices paired with that local area network may allow the access device to connect to them without requiring a login. Accordingly, only users of access devices that have authorization to access the local area network are authorized to access network devices within the local area network, and these users are authorized without having to provide login credentials for the network devices.

An accountless authentication process may also be performed when the user is remote so that the user can access network devices within the local area network, using an access device, without having to enter network device login credentials. The local area network can be identified using a network fingerprint. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network identifier (e.g., a fingerprint) and/or one or more keys to a network device and/or to the access device (e.g., running an application, program, or the like). A network fingerprint can be compared to previously generated network fingerprints available via the external network in order to associate the user and the access device with the local area network. In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway (e.g., a network user name and password, a network security key, or any other appropriate login information). The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server of a wide area network, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as being associated with the network and may assign the network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. In some embodiments, the server may transmit the network ID and the access device's security key directly to the access device. The network device and the access device may then communicate with the cloud server using the network ID and the unique key generated for each device. Accordingly, the access device may perform accountless authentication to allow the user to remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the local area network. Based on comparing a snapshot of a network fingerprint with one or more previously generated fingerprints, the server may associate the second gateway with the local area network due to there being few differences between the snapshot and the previously generated fingerprints. The server may generate a second set of security keys for the second gateway. For example, the server may generate a unique security key for the second network device and may generate a unique security key for the access device for use in accessing the second network device in the local area network. The server may associate the first network device and the access device with the local area network by storing a network ID (e.g., a previously generated fingerprint) and the first set of security keys in a first record or network profile. The server may also associate the second network device and the access device with the local area network by comparing a snapshot of the network ID to the first network ID and storing the second set of security keys in the record or profile. The server may then transmit the network ID and the first set of security keys to the first network device, and may transmit the network ID and the second set of security keys to the second network device. The two network devices may store the network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may need to be associated with the local area network by comparing a network ID snapshot (e.g., a snapshot of the network fingerprint) with a previously generated network ID, which facilitates allowing the access device to access and control network devices within the local area network.

Accordingly, techniques and systems are described herein for identifying a local area network using unique identifiers of network devices, access devices, and gateways connected to the network. Accordingly, a network identifier may be generated for a local area network that facilitates associating network devices and access devices, as well as the users of such devices, with a local area network. Whether located locally or remotely, a user may thus access all network devices in the local area network without having to furnish login credentials or other inputs.

FIG. 1 illustrates an example of a local area network 100. The local area network 100 includes network device 102, network device 104, and network device 106. In some embodiments, any of the network devices 102, 104, 106 may include an Internet of Things (IoT) device. As used herein, an IoT device is a device that includes sensing and/or control functionality as well as a WiFi transceiver radio or interface, a Bluetooth® transceiver radio or interface, a Zigbee® transceiver radio or interface, an Ultra-Wideband (UWB) transceiver radio or interface, a WiFi-Direct transceiver radio or interface, a Bluetooth® Low Energy (BLE) transceiver radio or interface, and/or any other wireless network transceiver radio or interface that allows the IoT device to communicate with a wide area network and with one or more other devices. In some embodiments, an IoT device does not include a cellular network transceiver radio or interface, and thus may not be configured to directly communicate with a cellular network. In some embodiments, an IoT device may include a cellular transceiver radio, and may be configured to communicate with a cellular network using the cellular network transceiver radio. The network devices 102, 104, 106, as IoT devices or other devices, may include home automation network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In some embodiments, network devices 102, 104, 106 may be used in other environments, such as a business, a school, an establishment, a park, or any place that can support the local area network 100 to enable communication with network devices 102, 104, 106. For example, a network device can allow a user to access, control, and/or configure devices, such as office-related devices (e.g., copy machine, printer, fax machine, or the like), audio and/or video related devices (e.g., a receiver, a speaker, a projector, a DVD player, a television, or the like), media-playback devices (e.g., a compact disc player, a CD player, or the like), computing devices (e.g., a home computer, a laptop computer, a tablet, a personal digital assistant (PDA), a computing device, a wearable device, or the like), lighting devices (e.g., a lamp, recessed lighting, or the like), devices associated with a security system, devices associated with an alarm system, devices that can be operated in an automobile (e.g., radio devices, navigation devices), and/or the like.

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device e.g., a television, a refrigerator, a security system, a game console, a browser, or the like), a speech or gesture interface (e.g., a Kinect™ sensor, a Wiimote™, or the like), an IoT device interface (e.g., an Internet enabled device such as a wall switch, a control interface, or other suitable interface), or the like. In some embodiments, the access device 108 may include a cellular or other broadband network transceiver radio or interface, and may be configured to communicate with a cellular or other broadband network using the cellular or broadband network transceiver radio. In some embodiments, the access device 108 may not include a cellular network transceiver radio or interface. While only a single access device 108 is shown in FIG. 1, one of ordinary skill in the art will appreciate that multiple access devices may communicate with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). For example, the access device 108 may communicate directly with network device 102, 104, 106 using Zigbee™ signals, Bluetooth™ signals, WiFi™ signals, infrared (IR) signals, UWB signals, WiFi-Direct signals, BLE signals, sound frequency signals, or the like. In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee™, Bluetooth™, WiFi™, IR, UWB, WiFi-Direct, BLE, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can provide communication capabilities to network devices 102, 104, 106 and/or access device 108 via radio signals in order to provide communication, location, and/or other services to the devices. The gateway 110 is directly connected to the external cloud network 114 and may provide other gateways and devices in the local area network with access to the external cloud network 114. The gateway 110 may be designated as a primary gateway. While two gateways 110 and 112 are shown in FIG. 1, one of ordinary skill in the art will appreciate that any number of gateways may be present within the local area network 100.

The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may provide radio frequencies on which wireless enabled devices in the local area network 100 can communicate. A gateway may also be referred to as a base station, an access point, Node B, Evolved Node B (eNodeB), access point base station, a Femtocell, home base station, home Node B, home eNodeB, or the like.

The gateways 110, 112 may include a router, a modem, a range extending device, and/or any other device that provides network access among one or more computing devices and/or external networks. For example, gateway 110 may include a router or access point, and gateway 112 may include a range extending device. Examples of range extending devices may include a wireless range extender, a wireless repeater, or the like.

A router gateway may include access point and router functionality, and may further include an Ethernet switch and/or a modem. For example, a router gateway may receive and forward data packets among different networks. When a data packet is received, the router gateway may read identification information (e.g., a media access control (MAC) address) in the packet to determine the intended destination for the packet. The router gateway may then access information in a routing table or routing policy, and may direct the packet to the next network or device in the transmission path of the packet. The data packet may be forwarded from one gateway to another through the computer networks until the packet is received at the intended destination.

A range extending gateway may be used to improve signal range and strength within a local area network. The range extending gateway may receive an existing signal from a router gateway or other gateway and may rebroadcast the signal to create an additional logical network. For example, a range extending gateway may extend the network coverage of the router gateway when two or more devices on the local area network need to be connected with one another, but the distance between one of the devices and the router gateway is too far for a connection to be established using the resources from the router gateway. As a result, devices outside of the coverage area of the router gateway may be able to connect through the repeated network provided by the range extending gateway. The router gateway and range extending gateway may exchange information about destination addresses using a dynamic routing protocol.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Figure 2:
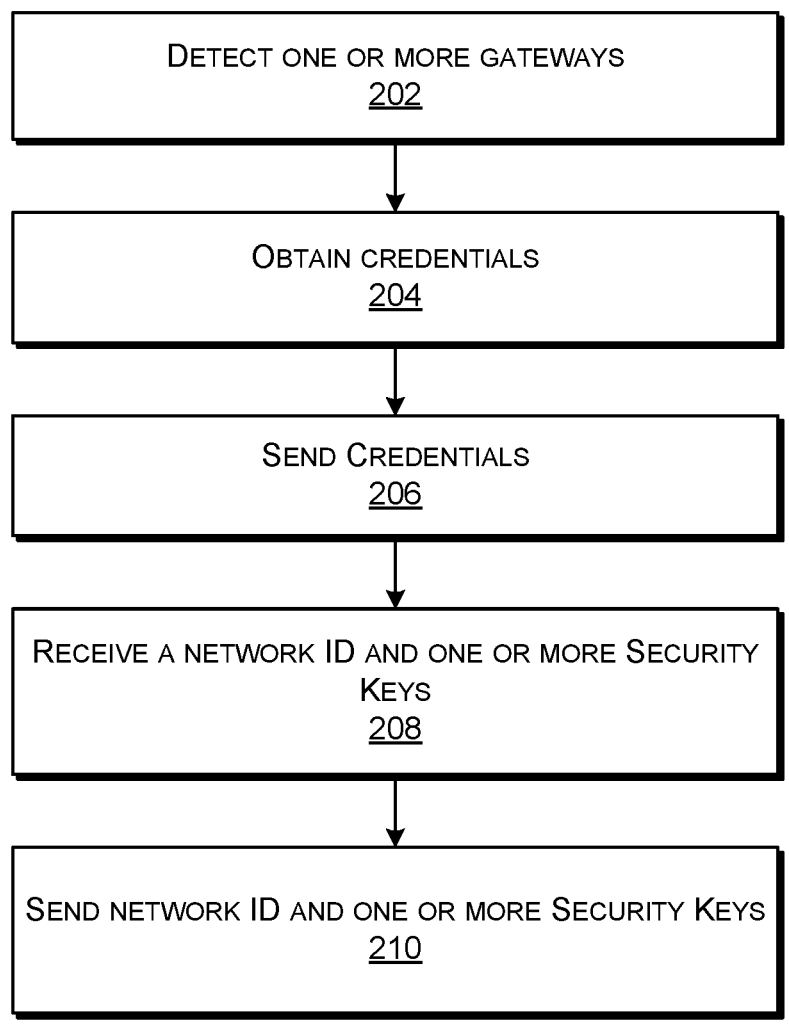
FIG. 2 is a flowchart illustrating an embodiment of a process for registering one or more network devices, in accordance with some embodiments.

Upon being powered on or reset, the network devices 102, 104, 106 may be registered with the cloud network 114 and associated with a logical network within the local area network 100. FIG. 2 illustrates an example of a process 200 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 2 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 202, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 204, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 206. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, manufacturer, make, model number, device type, logical device name, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 208, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 210, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within a modular tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 and 100 when the sensor is powered on. In yet another example, the device can be a fan and the status can include a value corresponding to a speed of the fan on a scale of 0 to 100 when the fan is powered-on.

As described above, upon being powered on or reset, the network devices 102 and/or 104 may be registered with the cloud network 114 and associated with a logical network within the local area network 100. Similarly, upon being powered or switched off or otherwise being disconnected from the network 100, the status of the network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each network device, or individual storage tables for each local area network or other subset of its network devices/networks. In one embodiment, a change in status may prompt the network device to push its change in in status to the cloud network 114 for storage or updating of the cloud's stored status table. In another embodiment, cloud network 114 and/or gateway 110 may continuously (or periodically) communicate with each network device to check to see if its status has changed.

In some embodiments, a network device (e.g. network device 102 and/or 104) may, upon connecting to the local area network 100, check the status of the network devices on the network 100. In other embodiments, one network device may check the status of one or more of the other network devices on the network 100. The network device may seek to check the status of another network device or access device for various reasons, including to display such status (es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, time stamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 114, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if network devices 102 and 104 were to each turn on and communicate their statuses to cloud network 114, cloud network 114 may analyze the status of network devices 102 and 104 and communicate to network devices 102 and 104 that they are each connected to the same local area network 100.

Figure 3:
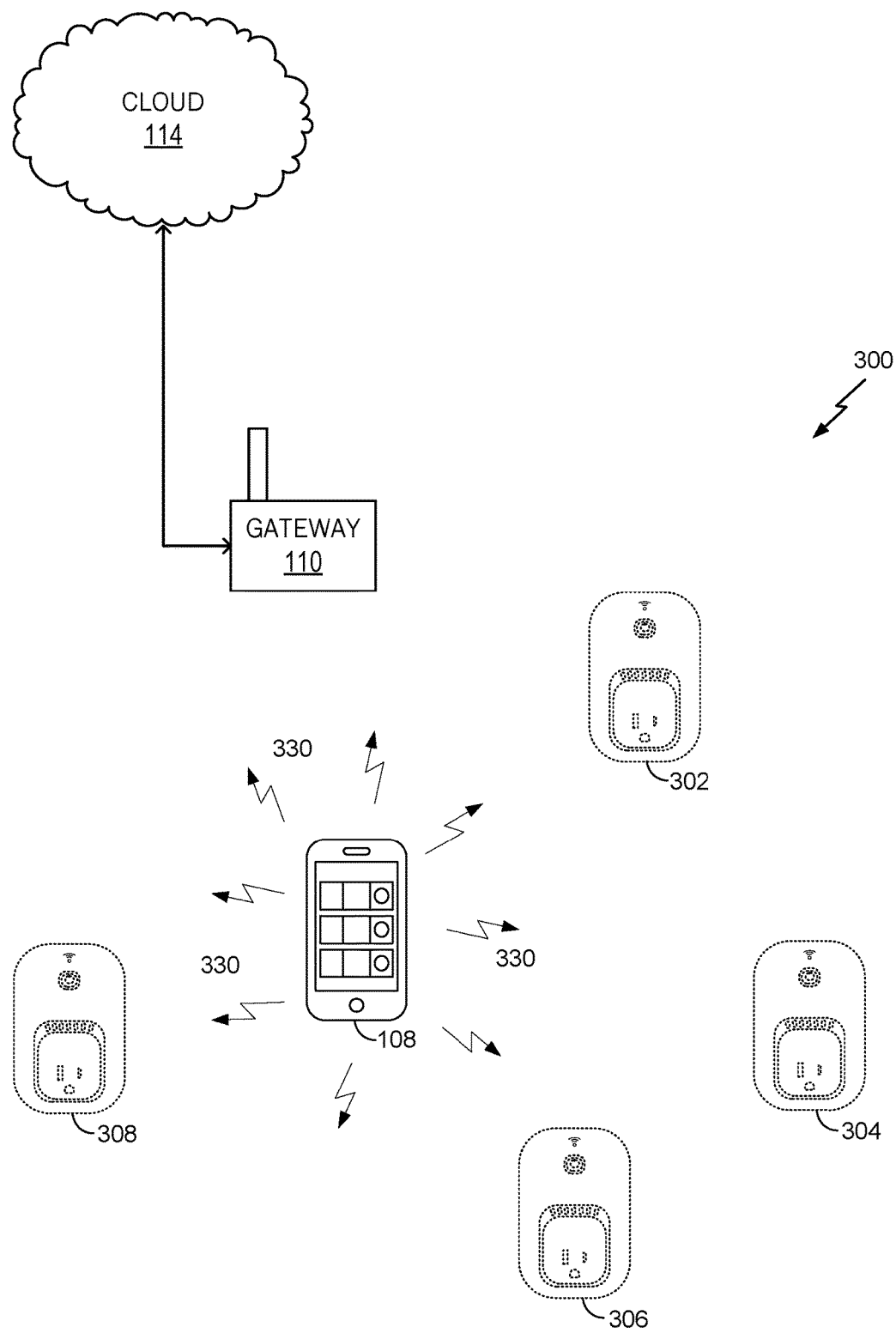
FIG. 3 is an illustration of an example of a network environment, in accordance with some embodiments.

FIG. 3 illustrates an example of a network 300, according to embodiments of the present invention. Specifically, the network 300 can be a wireless local area network enabling an access device to communicate with network devices to control adjustment of attributes related to operation of the network devices. Network 300 includes network device 302, network device 304, network device 306, and network device 308. The network 300 also includes access device 108. In other words, the network 300 may be substantially similar to the network 100 except that access device 108 has been turned on near the network 300, to which it is associated, or has entered an area to which the network 300 can reach.

When access device 108 can enter the network 300 as shown in FIG. 3, access device 108 may be authenticated based on the access device's authentication with the logical network or may otherwise commence communication with cloud network 114. Access device 108 may also communicate notification of its presence or other information directly to other network devices 302-308 within network 300, as shown in FIG. 3 by communication paths 330. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 300, including network device 302, network device 304, network device 306, and network device 308, information/data regarding its status. Such status data may include the fact that it is present and turned on, or other status data/information. At any time that network devices 302, 304, 306 and 308 recognize that access device 108 is present at network 300, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 302-308 and access device 108 may each receive communication from other network devices around the network 300, including the status of each of those network devices, network devices 302-308 and/or access device 108 may be continuously scanning network 300 (including, for example, running discovery algorithms) to determine whether any devices within the network have moved, turned on/off or otherwise added to or subtracted from the network 300, or have otherwise changed statuses.

Since network devices 302-308 and access device 108 may each receive communication from other devices around network 300, including the status of each of those devices, each network device within network 300 may know the status of each other network device in the network 300. For example, access device 108 or network devices 302-308 may not be required to communicate with cloud network 114 in order to obtain one or more of such statuses. Since cloud network 114 is an external network and may be remote from network 300, communication between network devices within the network 300 and cloud network 114 may take more time than communication between two devices within network 300. For example, communication between devices within network 300 may take anywhere from 1 millisecond to 100 milliseconds, while communication between a device within network 300 and the cloud network 114 may take anywhere from 50 milliseconds to 1 second or more). Furthermore, if a network device is retrieving information from cloud network 114, the request must travel from the network device to cloud network 114, and then the information must travel back from cloud network 114 to the network device. This process may double the latency caused by retrieving information with cloud network 114. Therefore, devices within the network 300 may choose to send and receive/retrieve statuses directly with other devices within the network 300 instead of communicating such information via cloud network 114. When a network device receives status data from another network device on the device's local area network 300, it may store that status data so that it may retrieve and use that status data at a later time.

Figure 4:
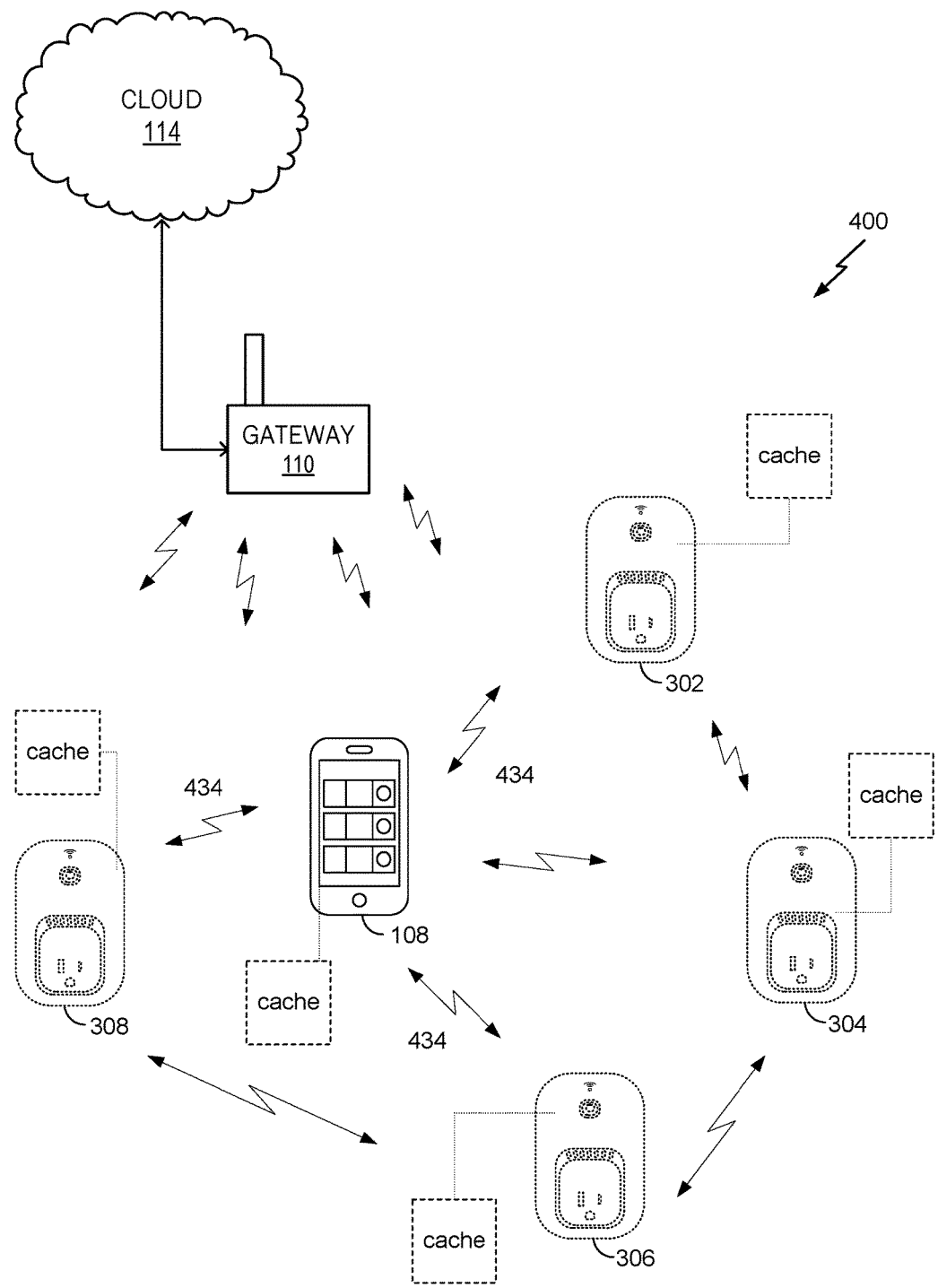
FIG. 4 is an illustration of an example of a network environment, in accordance with some embodiments.

FIG. 4 illustrates an example of a network 400, according to embodiments of the present invention. The local area network 400 may include network device 302, network device 304, network device 306, network device 308, and access device 108. FIG. 4 also illustrates that one or more network devices 302-308 and/or access device 108 may include a storage device, such as a cache, for storing data, including data regarding its own status and data regarding statuses received from the other devices within local area network 400. For example, access device 108 may, after being powered up, broadcast/send its status to network device 308 via communication 434. Network device 308 may store the status data received from access device 108 until the next time access device 108 updates its status by sending new/updated status data to network device 308. Respective caches may be used for storage within network devices 302-308 and/or access devices 108 within the local area network 400 so that each of the devices may be able to quickly retrieve the data it needs from storage. For example, the respective caches within network devices 302-308 can be used to store a current snapshot of an identifier for the network (e.g., a network fingerprint). The fingerprint can reflect each network device known by respective ones of network devices 302-308 to exist on network 400. An application operating on the access device 108 can access the cache to obtain information to display the visual interface for each network device 302-308 registered within the network 400. Although a caching device may be used to store such data within the network and/or access devices within the local area network 400, other types of storage may be used.

The cache can contain a known interface list including interface information for different, known types of devices. The known list can include a record for each network device known by the access device 108 to exist on the network 400. The cache can also include a snapshot of an identifier for the network (e.g., a network fingerprint) that reflects each network device known by access device 108 to exist on network 400. When an application is run on the access device 108, the access device 108 can access the known interfaces in the cache to present the display of access device 108. The display can present one or more visual interfaces, each corresponding to a network device known to exist on the network 400. Each visual interface can be generated based on a visual interface module corresponding to each device on the network 400. In an example, the display can include a visual interface (e.g., a modular tile) for each device in the network 400 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 400. For example, the status display can include a speed of a fan (e.g., a fan speed of 56 in a range of values between 0 and 100) of the network device 302 (e.g., a fan), a value of sensitivity of a sensor (e.g., a value of 34 in a range of values 0-100) for the network device 304 (e.g., a motion sensor), a value of brightness (e.g., 65 percent brightness) for the network device 306 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 400 and can use that information to update its own cache, update the status display, and/or pass the information to the cloud network 114 and/or the gateway 110 for trouble shooting and/or storage.

Even though each network device may know and store (e.g. in cache) the state of each other network device within local area network 400, a network device may not know when another network device changes status (e.g. turns/powers off). However, network devices and/or access devices within local area network 400 may broadcast/send any updates in its status to other devices on the network. For example, if network device 302 changes status, it may send status data to the other network devices, such as network devices 304, 306 and 308 and to access device 108. However, network device 302 may not know which devices to update since the other devices may change statuses periodically (e.g. turn off).

Therefore, a network or access device may subscribe to another network or access device within local area network 400. For example, network devices 304, 306 and 308 and access device 108 may subscribe to status data notifications/updates from network device 302. Such a subscription may be registered for upon initial connection with network device 302 when network device 302 first enters local area network 400 or at any other time after network device 302 has been associated with local area network 400. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 302 may store a list of network devices 304, 306 and 308 and access device 108 after those devices subscribe to network device 302. Then, when network device 302 undergoes a change in status, network device 302 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 400, each contain continuously updated statuses of each other device on the network and obtain those statuses and updates through direct communication without necessary use of the cloud.

Figure 5:
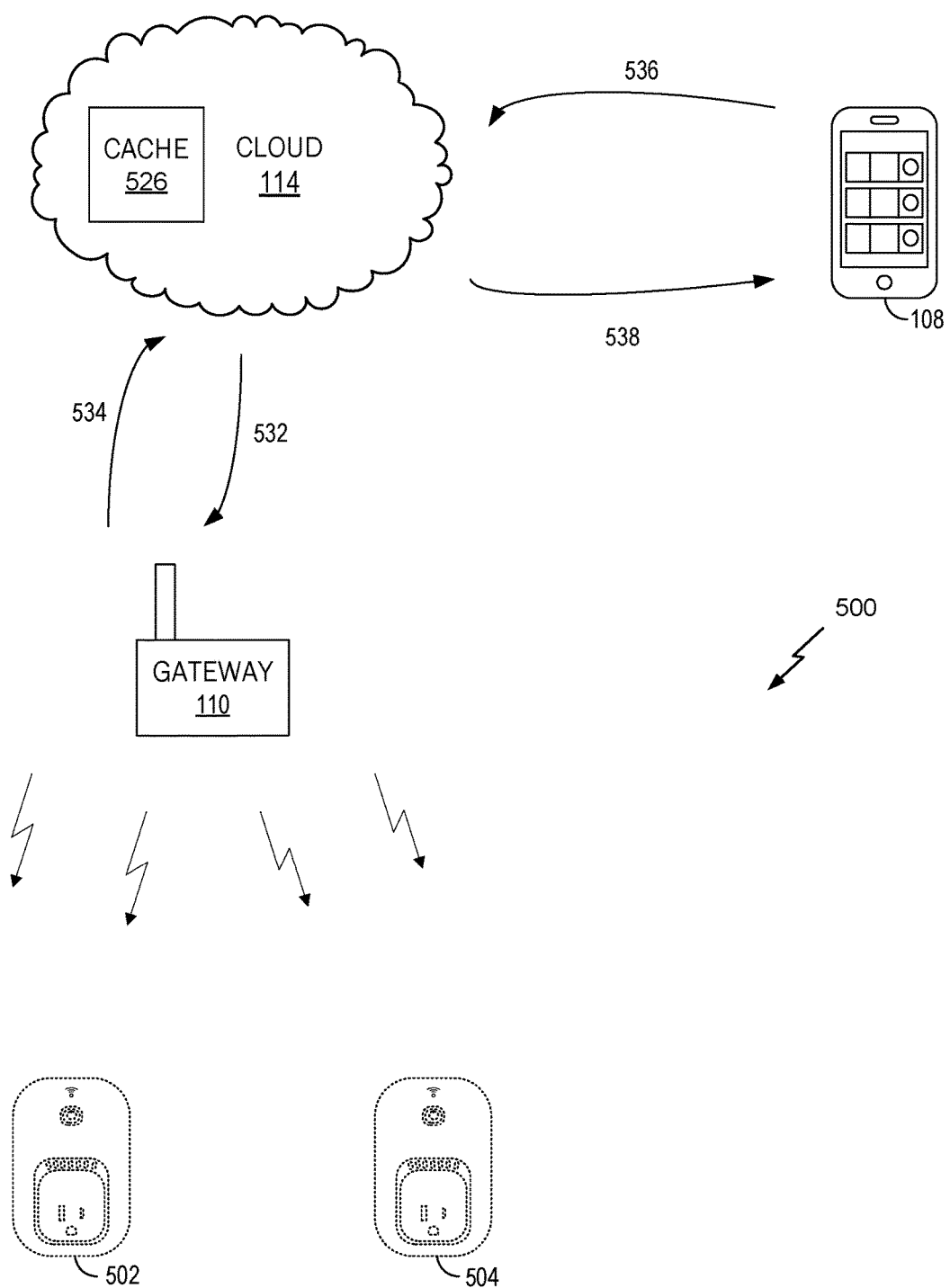
FIG. 5 is an illustration of an example of a network environment, in accordance with some embodiments.

FIG. 5 illustrates an access device 108 that is located remotely from network 500 (e.g. local area network), according to embodiments of the present invention. Local area network 500 includes gateway 110 and network devices 502 and 504 (which may be, for example, the same as any of network devices 302-308 in FIGS. 3 and 4), as shown in FIG. 5. However, network 500 may also include a variety of other network devices and one or more access devices directly connected to network 500. Gateway 110 is connected to cloud network 114, and allows network devices 502 and 504 to connect to cloud network 114, the internet, or other external networks via gateway 110. In some embodiments, the network devices 502 and 504 may include home automation devices that allow a user to access, control, and/or configure various home appliances located within the user's home, such as a television, radio, light, microwave, iron, and/or the like.

Access device 108 is not directly connected to network 500. Instead, access device 108 is external to network 500 and may connect to cloud network 114 and to network 500 via cloud network 114. As noted, network devices 502 and 504 may change status on a periodic basis. In some embodiments, even when external to and not directly connected to network 500, an access device may request to check the status of the devices on the network. When access device 108 seeks to check the status of any device on the network, the access device 108 may transmit/send a communication 536 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 538 of such status data to the access device 108. For example, after network devices 502 and 504 are turned on, authenticated and are a part of network 500, network devices 502 and 504 may communicate their statuses to cloud network 114. Furthermore, any time the status of network devices 502 and 504 changes, the device that incurred a status change may push/send information (e.g. an indication) of that status change to cloud network 114. Cloud network 114 may store, in cache 526 or otherwise, the statuses (which may be time stamped in metadata or otherwise) of network devices 502 and 504. Therefore, when access device 108 requests from cloud network 114 the statuses of devices on network 500, cloud network 114 may send its most recently stored/updated statuses to access device 108.

To obtain the most updated status data of devices within network 500, cloud network 114 may, upon receiving a request for status data related to network devices 502 and 504, transmit/send a communication 532 (e.g. request, query, etc.) for such status data to network devices 502 and 504 via gateway 110. Once network devices 502 and 504 receive this request, network devices 502 and 504 may send a communication 534 (e.g. updated status data) to cloud network 114 to replace the previously stored/cached statuses in cache 526. Upon receipt of updated status data 534 from network 500, cloud network 114 may send a communication 538 of such status data to the access device 108.

However, the process of cloud network 114 requesting updated statuses from network devices 502 and 504 within network 500 may cause latency within the system. More specifically, the time required for cloud network 114 to request updated statuses from network devices 502 and 504 and to in turn receive updated statuses from network devices 502 and 504 may be substantially greater than the time required for cloud network 114 to send its currently stored statuses (without being updated) for network devices 502 and 504 to access device 108. For example, of the total time required for access device 108 to receive updated statuses from cloud network 114, 80% or more of that total time may include cloud network 114 requesting updated statuses from network devices 502 and 504. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 502 and 504 is the transmission of data between cloud network 114 and network devices 502 and 504, the access device 108 and cloud network 114 may maximize efficiency by minimizing the effect of the transmission of data between cloud network 114 and network devices 502 and 504 on the whole process/system.

Figure 6:
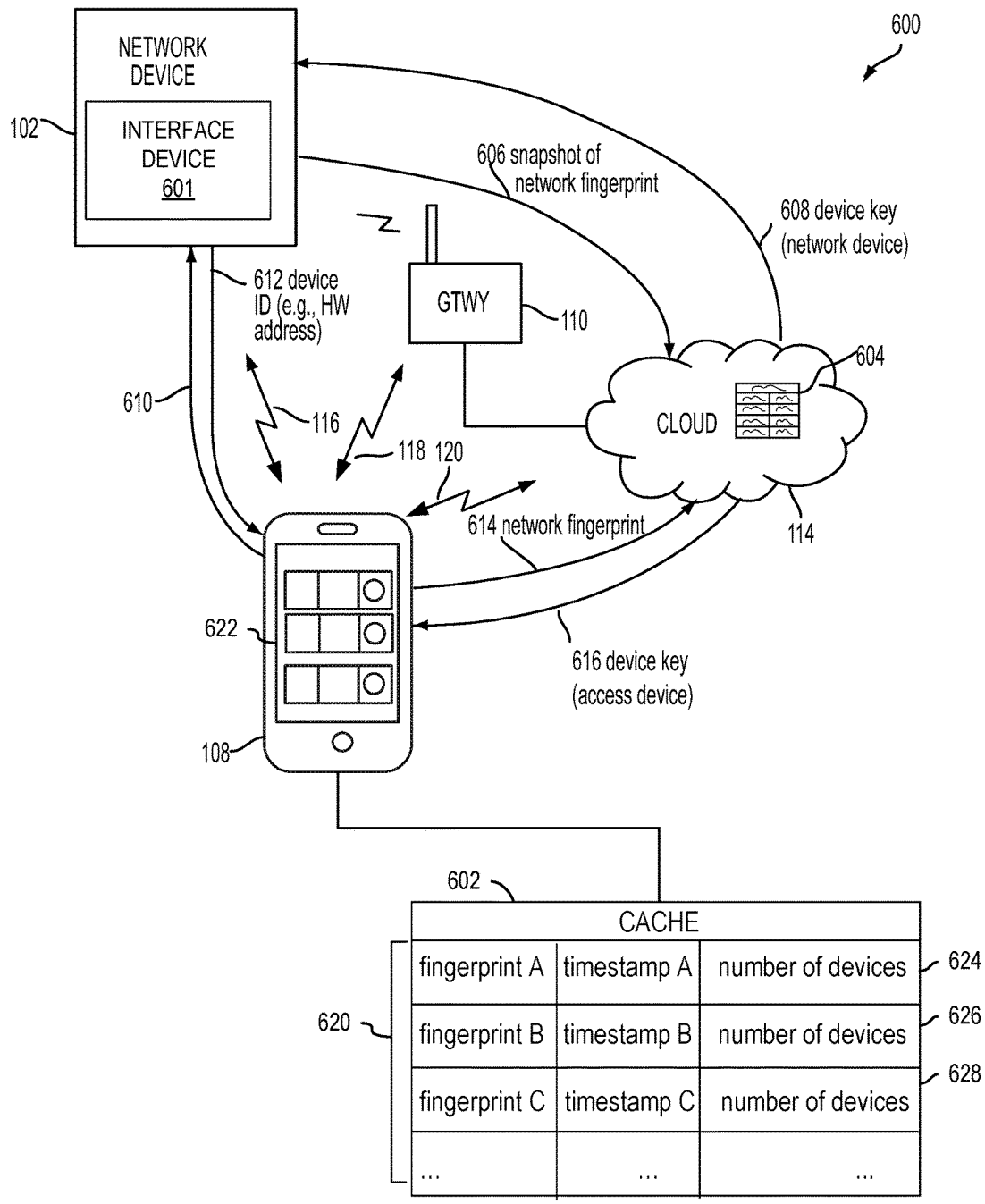
FIG. 6 is an illustration of data flows for generating a network fingerprint within an example wireless network environment, in accordance with some embodiments.

FIG. 6 illustrates an embodiment of a process 600 for identifying (e.g., fingerprinting) a network. As shown, the process 600 may be performed by one or more computing devices, such as network device 102, a server associated with cloud network 114, and access device 108 described above with reference to FIGS. 1-5. In some embodiments, the network device 102 is associated with a home automation network, such as the local area network 100 described above with respect to FIG. 1. Process 600 is illustrated as a data flow diagram, the operation of which represents operations that can be implemented in hardware, computer instructions, or a combination thereof. Gateway 110 is connected to cloud network 114, and allows network device 102 to connect to the cloud network 114, the Internet, or other external networks via gateway 110. In some embodiments, the network device 102 may be a home automation network device that allows a user to access, monitor, control, and/or configure various home appliances located within the user's home, such as a television, radio, light, microwave, iron, space heater, sensor, and/or the like. For example, the user can monitor and control network devices by interacting with a visual interface of the gateway 110 (i.e., a web page for gateway 110) and/or a visual interface rendered on display 622 of the access device 108. Such interaction can occur after the user and/or access device 108 have been associated with the network devices. The user and access device 108 can be associated with the network devices by using a network identifier as described in the following paragraphs.

In an embodiment, an application may be run on the access device 108. The application may cause the access device 108 to present a display 622 with a modular visual interface for each network device accessible on the local area network 100. In one example, the access device 108 can access the network devices after a current network identifier has been compared to a previously created network identifier in order to associate the access device 108 with the same local area network 100 that the network devices are connected to. When the application is run on the access device 108, the access device 108 can access a cache 602.

The cache 602 can be a local cache located in onboard storage of the access device 108. The cache 602 can also contain a network identifier table 620 with records 624, 626 and 628 including fingerprints reflecting known access devices network devices at different points in time. As shown, each of records 624, 626 and 628 can include a fingerprint, a timestamp indicating when the fingerprint was taken, and other information such as the number of devices in the network at the time. The network identifier table 620 can include a record for each fingerprint stored by the access device 108, where fingerprints reflect devices known to exist on the local area network 100. In an embodiment, the fingerprints stored in cache 602 can be hash values generated by executing a cryptographic hash function. Exemplary communications used to populate cache 602 are described in the following paragraphs.

The process 600 can include utilizing communication 606 to send a snapshot of network fingerprint from a network device 102 to a server of cloud network 114. For simplicity, communication 606 is shown as a direct communication between network device 102 and cloud network 114. However, it is to be understood that in an embodiment, communication 606 can be sent via gateway 110 to cloud network 114. In an additional or alternative embodiment, communication 614 is sent from access device 108 to cloud network 114. For example, communication 614 shown in FIG. 6 may include a snapshot of the network fingerprint and access device 108 may initiate communication 614 to cloud network 114. In the example of FIG. 6, communication 606 includes a unique identifier for the network device 102 and a snapshot of the network fingerprint. For example, communication 606 can include a unique identifier for network device 102. In some embodiments, communication 606 may include transmitting a unique identifier (ID) for the network device 102. In some embodiments, the unique ID for the network device can be used to identify one or more properties and capabilities of network device 102. The unique identifier for the network device can be sent with registration information. The unique identifier can be used by cloud network 114 determine a logical name of the network device, one or more capabilities of the network device, a manufacturer of the network device, and a transience level of the network device. In one example, communication 606 can include a hardware address corresponding to network device 102. The hardware address can be embodied as a MAC address whose contents are used to determine properties of network device 102.

At 608, the process 600 includes transmitting an indication that network device 102 is associated with the network. For example, the server of the cloud network 114 may transmit the indication to network device 102. In some embodiments, the transmitting may include transmitting results of comparing a network identifier (ID) for the network to the network identifier snapshot transmitted with communication 606. For example, the network device 102 may receive a communication from the server indicating that the network device 102 is associated with the network based on comparing network fingerprints from different points in time. In such embodiments, the server may determine that a match between the snapshot and a previous network fingerprint exists. The cloud network 114 can include a data store 604 of network fingerprints taken at different points in time. In an embodiment, data store 604 can be a fingerprint database where each record in the database includes a network fingerprint and is identified by a timestamp indicating when the fingerprint was created. In one embodiment, the fingerprints stored in data store 604 can be hash values generated by executing a cryptographic hash function.

Cloud network 114 can use the unique device ID to determine properties for network device 102. The properties can be reflected in a network identifier (e.g., a network fingerprint) that cloud network 114 stores. As shown in FIG. 6, cloud network 114 can access a data store 604 of network identifiers. A plurality of network fingerprints can be stored in data store 604. For example, each fingerprint in data store 604 can reflect network devices whose properties have been determined using respective, unique network device identifiers. In an embodiment, data store 604 is a database configured to fingerprints created at different points in time. The fingerprints can reflect a plurality of network devices connected to a given network, with each of the stored fingerprints being identified by a timestamp indicating when the fingerprint was created. For instance, the network device 102 having a unique device identifier may be associated with an existing network based on comparing a fingerprint snapshot received from the network device 102 or access device 108 with older fingerprints stored in data store 604. In some embodiments, information in communication 606 can be used to create a new fingerprint to be stored in data store 604. After using fingerprints to determine that network device 102 is associated with a network, cloud network 114 sends communication 608 to network device 102 in order to provide a device key to network device 102. In one embodiment, communication 608 can include a unique device key corresponding to network device 102 that is used for accountless authentication of network device 102. Upon receiving communication 608 with the network device key, network device 102 can store the key. For example, the key can be stored by an interface device 601 of the network device 102. In an embodiment, communication 608 can also include an access device key, and network device 102 can store both the access device key and the network device key. Interface device 601 can be configured to take a snapshot of the network that network device 102 is currently connected to. The snapshot will reflect the presence of gateway 110, access device 108, and any other devices connected to the network at the time the snapshot is taken, including the network device 102 itself. In an embodiment, the interface device 601 is implemented as a 'smart module' in hardware and firmware, such as, for example, a system on a chip (SOC) integrated into the network device 102.

The interface device 601 can include flash memory and dynamic random access memory (DRAM). The flash memory may be used to store instructions or code relating to an operating system, one or more applications, and any firmware. The flash memory may include nonvolatile memory so that any firmware or other program can be can updated. In the event the interface device 601 loses power, information stored in the flash memory may be retained. The DRAM of the interface device 601 may store various other types of information needed to run the interface device 601, such as all runtime instructions or code. The flash memory or DRAM or a combination thereof may include all instructions necessary to communicate with network device 102.

The process 600 can include sending, from the access device 108, intra-network communication 610 including a network fingerprint snapshot, to the network device 102. The network fingerprint snapshot sent with communication 610 can reflect devices that access device 108 sees on the network. For example, access device 108 can take a network fingerprint snapshot that reflects network device 102, gateway 110, and/or other network devices and access devices connected to the network. For instance, communication 610 can be sent from access device 108 to network device 102 with a snapshot created by access device 108 and reflecting other devices that access device 108 currently sees on the network. This snapshot will reflect the presence of gateway 110, the network device 102, and any other devices connected to the network at the time the snapshot is taken, including access device 108 itself. In response to the communication 610 sent from access device 108, the process 600 can include receiving intra-network communication 612 at the access device 108 with device information for the network device 102. According to an embodiment, in response to communication 610, the network device 102 can send communication 612 to inform the access device 108 of the unique device identifier of the network device 102. For instance, in response to receiving communication 610, the network device 102 may send communications 612 to the access device 108 with at least a unique device ID. As shown in FIG. 6, communications 612 can include a hardware address for the network device 102. The process 600 can include utilizing intra-network device communications 610 and 612 as part of a discovery process for the network device 102. For example, when the network device 102 is initially connected to the network, it and access device 108 can automatically exchange communications 610 and 612 to provide the access device 108 with information that can be used to associate the network device 102 and the access device 108 with the same local area network.

Within the context of network fingerprinting, embodiments can compare network fingerprints created at different points in time with fingerprint snapshots to determine that network devices and access devices should be associated with the same network. These comparisons of fingerprints can be performed by a remote server, such as a server associated with the cloud network 114, in order to associate a newly discovered network device and/or a newly discovered access device with an existing network. Fingerprint comparisons can also be done locally on an access device or a gateway in cases where a connection to the Internet or the cloud network 114 is unavailable or unreliable, and immediate use of a newly discovered network device is desired. In this case, an application on the access device 108 or a relatively stationary device such as gateway 110 could, based on fingerprint snapshots received from the network device 102 and access device 108, determine that the network device 102 and the access device 108 are connected to the same network. Such a comparison may not be the based on comparisons of multiple fingerprints created over time, such as those available from the cloud network 114. However, such a comparison will suffice until the application is able connect to the Internet and/or the cloud network 114 and subsequently confirm that the network device 102 and the access device 108 are indeed associated with the same network.

In some embodiments, communication 612 may be received when the network device 102 is rebooted (e.g., powered on, reset or restored to default settings, or the like). For example, when the network device 102 is rebooted, it may broadcast one or more messages on the local area network 100 to discover whether there are any access devices in the local area network 100. For example, communication 612 may be broadcast according to a UPnP protocol during a discovery process. The network device 102 may receive communications 610 from access device 108 indicating that it is located within the local area network 100 and sending its own network fingerprint snapshot to network device 102. That is, after receiving a broadcast message from network device 102, access device 108 may then take a fingerprint snapshot and transmit it to network device 102 by sending communication 610 in order to receive the communication 612 including a unique identifier for the network device.

After receiving communication 612, if the access device 108 can access the cloud network 114, it sends a communication 614 to the cloud network 114 as fingerprint that reflects the presence of the network device 102 in the network. Communication 614 is described in further detail below. Otherwise, if the access device 108 cannot access the cloud network 114, the access device 108 can compare a fingerprint snapshot received from the network device 102 with a previously created fingerprint stored in cache 602. As discussed above, cache 602 can be a local cache stored on the access device 108. Previously generated fingerprints can be stored in cache 602 with timestamps indicating when the fingerprints were generated. These fingerprints can reflect, for example, one or more network devices, a gateway, and other access devices present on a network at a certain point in time.

In some embodiments, when an access device is connected to the cloud network 114, the access device 108 sends communication 614 to transmit a network fingerprint to cloud network 114 from access device 108. The communication 614 can include a fingerprint snapshot reflecting at least the devices that access device knows to be present on the network. For example, the fingerprint sent with communication 614 can reflect the network device 102, the gateway 110, and the access device 108 itself. At this point, the cloud network 114 can compare the network fingerprint sent with communication 614 to fingerprints previously stored in data store 604 in order to determine that the access device 108 is connected to a known network. If the cloud network 114 determines that there are no differences, or only insignificant differences between the fingerprint in communication 614 and an older fingerprint in its data store 604, it transmits an access device key to the access device 108 via communication 616. For example, the cloud network 114 can determine, based on communication 614, that the access device 108 is associated with an existing network. By will connecting to the cloud network 114 and exchanging communications 614 and 616 with the cloud network 114, the access device 108 can obtain an access device key so that access device 108 can authenticate to the network.

Upon receiving communication 616 from the cloud network 114, the access device 108 authenticates to the network using the access device key received via communication 616. That is, when a mobile access device is remote from the local area network 100, it can exchange communications 614 and 616 with the cloud network 114 to receive an access device key. Information received via communications 616 can also include network fingerprints used to populate records of cache 602. New records in cache 602 can be added using fingerprints stored in the data store 604 of cloud network 114. For example, fingerprints can be received via communication 616. That is, new records can be created in cache 602 when communication 616 includes a network fingerprint sent from the cloud network 114.

Records 624, 626, 628 in cache 602 store network fingerprints and timestamps that reflect known network devices. The access device 108 uses the records in cache 602 to determine that it is associated with the same network as a given network device. For example, the cache 602 can include a fingerprint reflecting the network device 102, access device 108, and other network devices in the local area network 100.

Display 622 can also include an indicator representing a state of network device 102. In embodiments, communications 612 and/or 614 can include a last known state of the network device 102 and/or historical data associated with the network device 102. In one embodiment, such state information can be based on information received via communication 612 from the network device 102 when the access device 108 is connected to the local area network 100. In this way, display 622 of the access device 108 can reflect a current state and historical data for the network device 102 when the mobile device is not connected to the local area network 100. In additional or alternative embodiments, the state information can be based on information received via communication 616 from the cloud network 114 when the access device 108 is connected to the cloud network 114. Using the state information, an interface module or tile for the network device 102 within display 622 can indicate an 'on' or 'off' state for the network device 102 when the network device is powered on or off.

Figure 7:
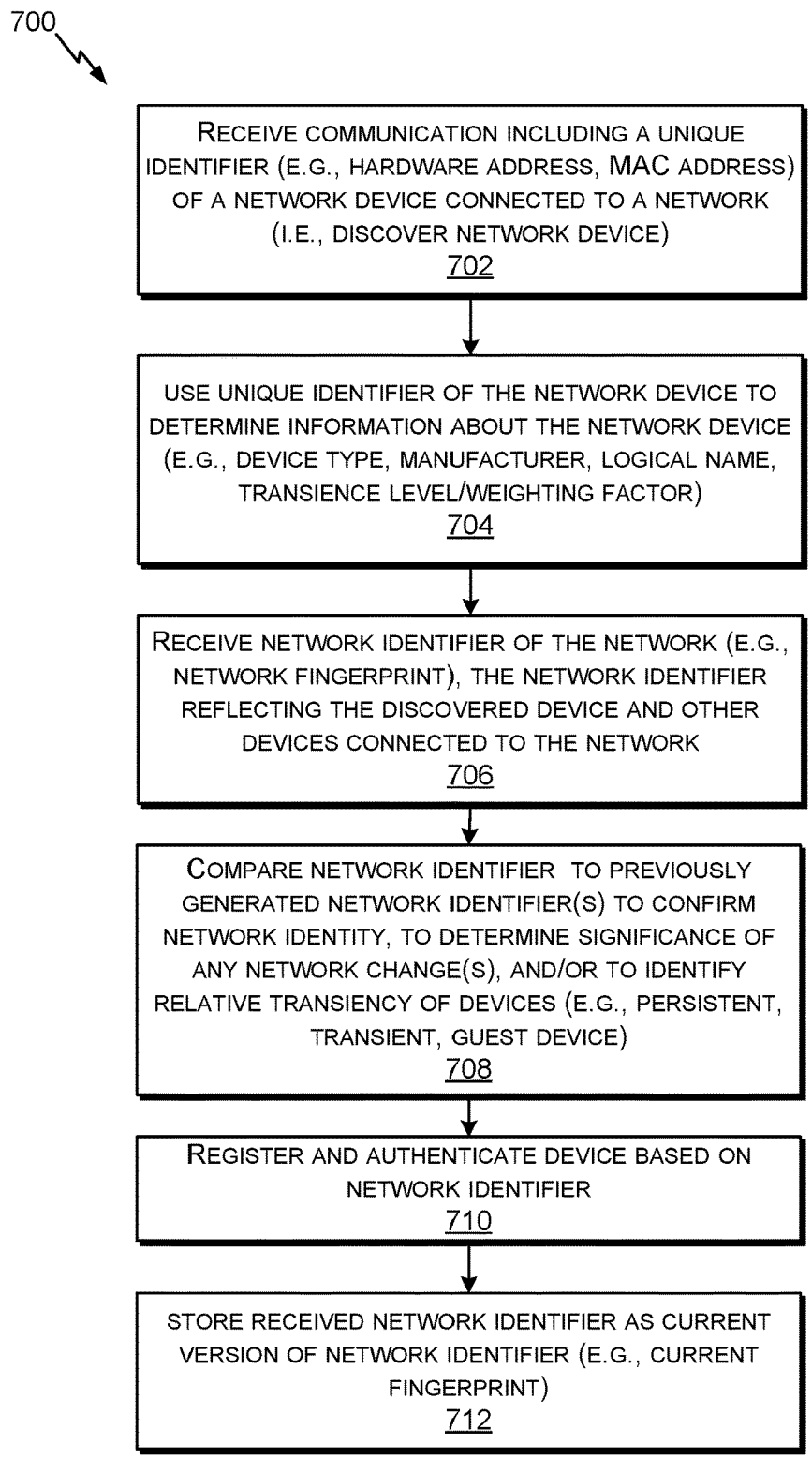
FIGS. 7, 8, and 9 are flowcharts illustrating processes for identifying networks, in accordance with some embodiments.
Figure 8:
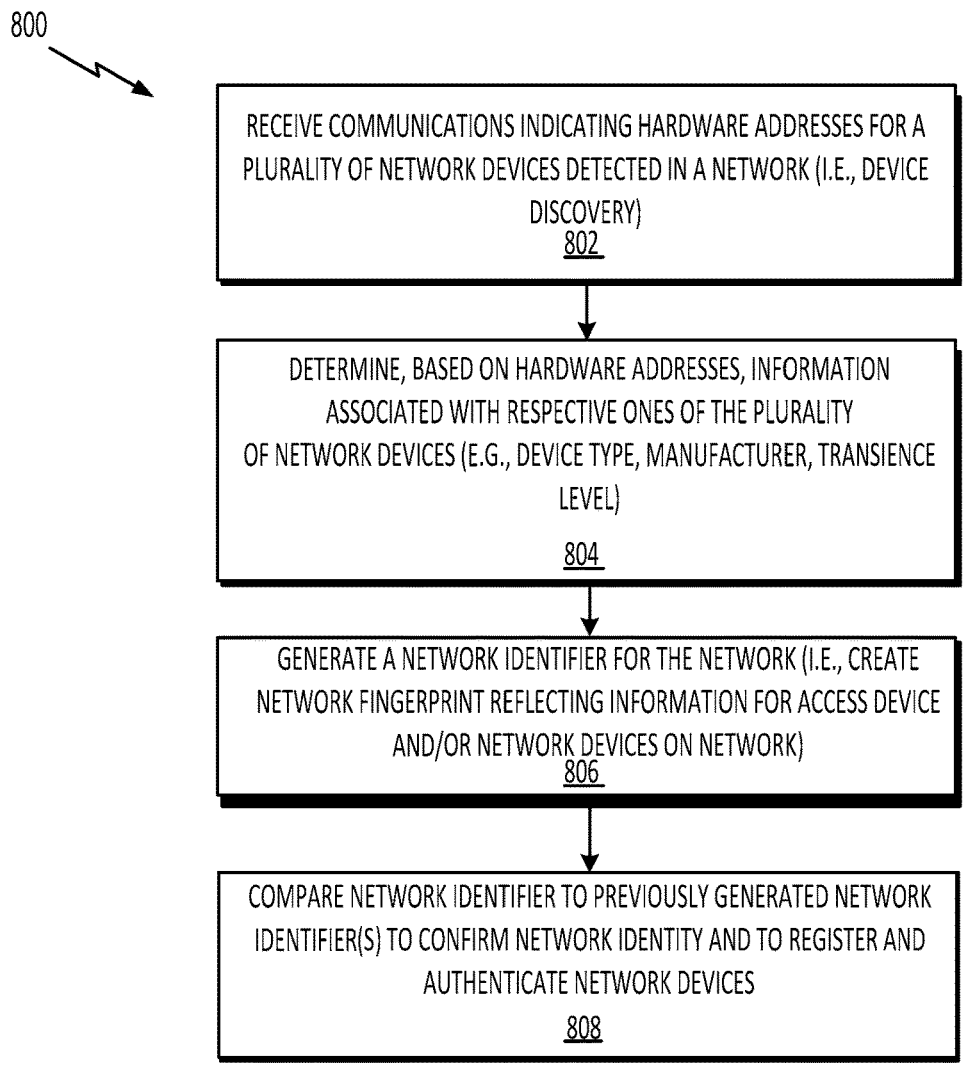
Figure 9:
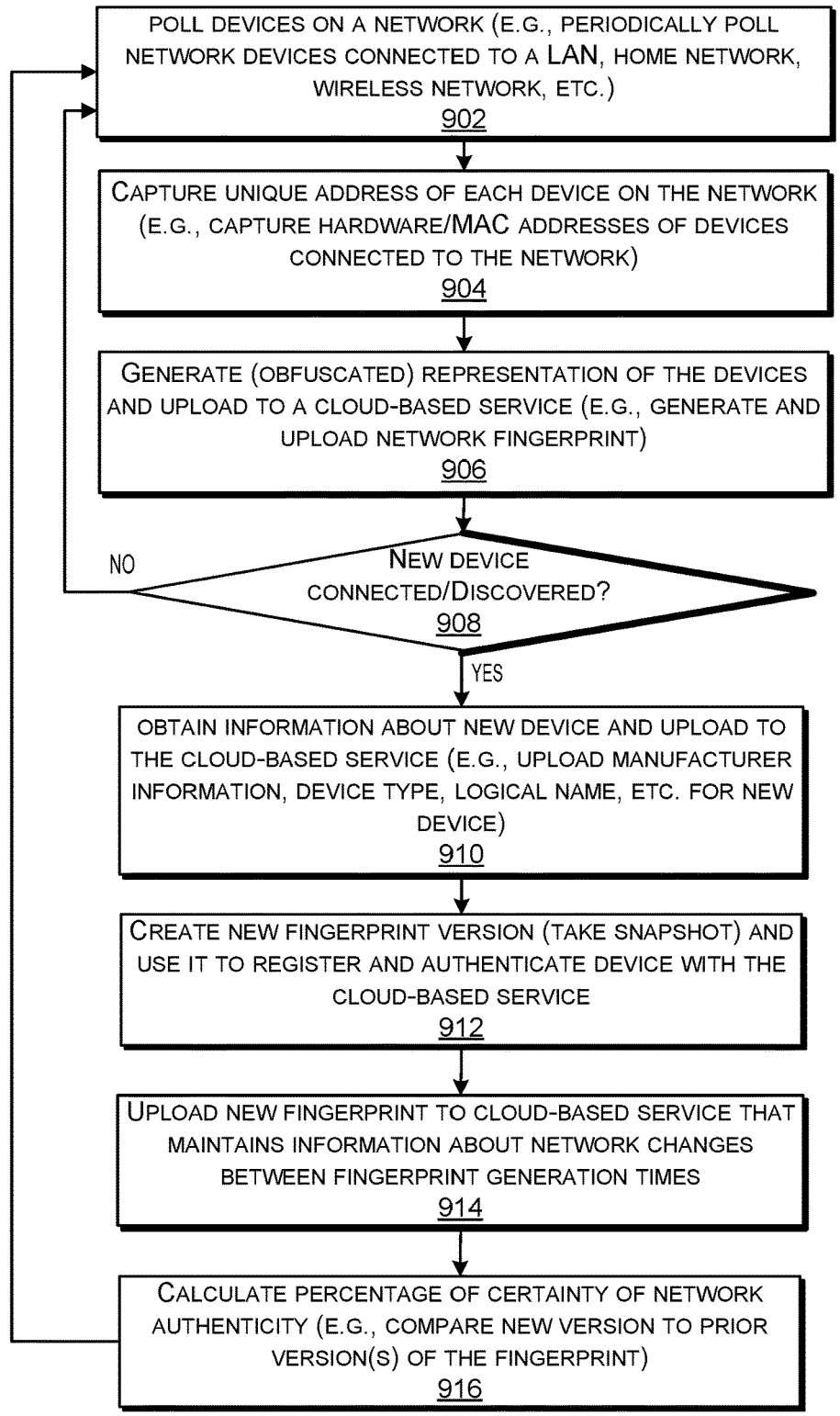

FIGS. 7-9 provide techniques for identifying (e.g., fingerprinting) local area networks and using the network identification to associate devices and users with local area networks. The techniques allow a local area network to be identified regardless of whether mobile devices and/or network devices connected to the network have previously been associated with or connected to the network. For example, using the techniques described below, the server of the cloud network 114 may determine that a newly discovered network device is connected with the wireless local area network 100, and compare a newly-generated network fingerprint snapshot with a retrieved, previously stored fingerprint for the network. Upon determining that a new fingerprint snapshot has no significant differences with a previous fingerprint, the server may provide device keys to a network device and an access device 108 so that they are associated with and authenticated to the wireless local area network 100.

Processes 700, 800, and 900 are illustrated as a logical flow diagrams, the operation of which represents operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 700, 800, and 900 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory. The process 700 utilizes intra-network communications to inform an access device of the existence of a network device on a network, to identify the network, and to provide device keys for the network device and the access device once the devices are determined to be associated with the network. In some aspects, the processes 700, 800, and 900 may be performed by one or more computing devices, such as the server of the cloud network 114, the access device 108, the gateway 110, and the network device 102 discussed above with respect to FIGS. 1 and 3-6.

FIG. 7 shows a flow chart showing an exemplary set of steps for a process 700 of fingerprinting a network. At 702, the process 700 includes receiving a communication including a unique identifier of a network device connected to a network. As shown in FIG. 7, this step can be performed as part of discovery of a network device. In an embodiment, the communication received in 702 can include a unique hardware address such as, for example, a MAC address, of a network device connected to a network. Step 702 can also include receiving a snapshot of a network fingerprint. For instance, 702 can be performed using communications 606, 612, and 614 described above with reference to FIG. 6.

At 704, the unique device identifier received at 702 is used to determine information about the network device (e.g., device type, manufacturer, logical name, transience level/weighting factor). In embodiments, the determination performed in 704 can be performed on a server. For example, 704 can be performed by a server of cloud network 114 described above with reference to FIG. 6.

Next, at 706 a network identifier of the network (e.g., a network fingerprint) is received. The network identifier received in 706 reflects the discovered device and other devices connected to the network. For instance, 706 can be performed using communication 614 described above with reference to FIG. 6.

At 708, the network identifier received at 706 is compared to previously generated network identifier(s) to confirm network identity, to determine significance of any network change(s), and/or to identify relative transiency of devices. As shown in FIG. 7, 708 can identify persistent devices, transient devices, and/or guest devices based on comparing a received network identifier with previously generated network identifiers generated at different points in time in the past.

At 710, the process 700 includes registering and authenticating a device based on the comparison of the network identifiers from 708. For example, 710 can be performed using communications 608 and 616 described above with reference to FIG. 6.

Next, at 712, the process 700 includes storing the received network identifier as the current version of network identifier (e.g., the current fingerprint). For example, 712 can be performed by storing information for the network identifier received at 706 with a timestamp as a record in the cache 602 of an access device 108. Also, for example, 712 can include storing information for the received network identifier with a timestamp as a record in the data store 604 of the cloud network 114.

FIG. 8 illustrates another embodiment of a process 800 for identifying networks. In some aspects, the process 800 may be performed by a computing device, such as the server of the cloud network 114 discussed above with respect to FIGS. 1 and 3-6.

The process 800 utilizes intra-network communications to inform a cloud network server of a change to a network, such as, for example, the discovery of a new network device, and to provide a device key to a network device and/or an access device. In some embodiments, the access device is a mobile device, such as, for example a smart phone. At 802, the process 800 includes receiving a communication, wherein the communication includes registration information (e.g., a registration packets) for network devices connected to a network. The network may include a local area network (e.g., local area network 100). For example, the server of the cloud network 114 may receive communications from network devices 102, 104 and/or 106. As previously described with respect to FIG. 1, the network devices 102, 104, and/or 106 may send a communication to the server indicating that they are connected to the network, where the communication includes a unique device ID. For example, the network devices 102 and 104 may send a first unique identifier and a second unique identifier to the server, as previously described, and let the server determine respective properties corresponding to each of network devices 102 and 104. As previously described with respect to FIGS. 1 and 6, a gateway 110 can send registration information to the cloud network 114. For example, 802 can include receiving communications indicating hardware addresses for a plurality of network devices detected in a network. As shown in FIG. 8, 802 can be performed as part of device discovery.

At 804, based on the unique device identifiers (e.g., hardware addresses) received at 802, the server may determine information associated with respective ones of the plurality of network devices. As shown in FIG. 8, 804 can include determining a device type, manufacturer, and transience level for each of the devices. In one embodiment, the unique device identifiers used at 804 include MAC addresses of network devices.

Next, at 806, the process 800 includes generating a network identifier for the network. As shown, 806 can include creating a network fingerprint reflecting information for access device and/or network devices on a network. In an embodiment, 806 can include receiving communication 606 from a network device 102 and/or receiving communication 614 from an access device 108 as described above with reference to FIG. 6. For example, an access device 108 may discover a network device 102, receive its unique hardware ID, and submit that unique ID to the cloud network 114 in order to have a server in the cloud network generate a new fingerprint for the network that reflects properties of the network device 102.

At 808, the network identifier generated at 806 is compared to previously generated network identifier(s) to confirm network identity and to register and authenticate network devices. This can be performed by determining that no significant differences exist between the network identifier generated at 806 and an older network identifier previously stored in data store 604.

As part of 808, the process 800 can include transmitting device keys to an access device and respective network device keys to respective ones of the plurality of network devices so that they can be associated with and authenticated to the network.

FIG. 9 illustrates an embodiment of a process 900 for identifying networks and changes to networks over time using network fingerprints. In some aspects, the process 900 may be performed by computing devices, such as access device 108, the gateway 110, and the server of the cloud network 114 discussed above with respect to FIGS. 1 and 3-6.

The process 900 utilizes intra-network communications to inform a cloud network server of the existence of network devices and to provide device keys for the network devices to a network devices and an access device. At 902, the process 900 includes polling devices on a network. As shown in FIG. 9, 902 can be repeatedly performed by periodically polling network devices connected to a network such as, for example, a local area network. As shown, the local area network can be, for example, a home network or a wireless network.

At 904, a unique address of each device on the network is captured. As shown, 904 can include capturing hardware/MAC addresses of devices connected to the network. Next, at 906, an obfuscated representation of the devices is generated and uploaded to a cloud-based service. As shown, 906 can include generating and uploading a network fingerprint. In an embodiment, 906 can include transmitting a network fingerprint from an access device 108 and/or a gateway 110 associated with a given network.

At 908, the process 900 includes determining whether new device has been connected to the network. As shown, 908 can be performed by determining if a new device such as a network device or an access device has been discovered on the network. If it is determined that there is a new device on the network, control is passed to 910 where information about the new device is obtained and uploaded to the cloud-based service. Otherwise, control is passed back to 902. As shown in FIG. 9, 910 can include uploading manufacturer information, device type, logical name, and other information for the new device. In an embodiment, 910 can include using information obtained about the new device to infer a transience level (e.g., relatively permanent, transient, or guest device) for the new device. For example, if the manufacturer information and device type indicates that the new device is a water heater network device, 910 can include indicating that the new device is relatively permanent.

Next, at 912, a new fingerprint version is created and used to register and authenticate a device with the cloud-based service. As shown, 912 can include taking a snapshot of the network fingerprint. The snapshot can be compared to a previous version of the fingerprint to determine that the device (e.g., a network device or an access device) should be associated with the network. At 914, the process 900 includes uploading new fingerprint to a cloud-based service that maintains information about network changes between fingerprint generation times.

Then, at 916, a percentage of certainty of network authenticity is calculated. As depicted in FIG. 9, 916 can be performed by comparing the new, current version of a fingerprint to one or more prior versions of the fingerprint. In one embodiment, 916 can include determining a measure of confidence (e.g., expressed as a percentage or other value) that the new fingerprint and older fingerprints identify the same network.

Any of the above techniques are used to identify a network and to associate network devices with the network. The server may receive a unique identifier (e.g., network device MAC address) of a network device 102 and query a database to determine properties of the network device using the unique identifier.

Once any of the above techniques are used to identify a network, the server may maintain a cloud-based registry of stored network identifiers in order to enable subsequently-discovered access devices such as mobile devices to be authenticated to the network by comparing newly generated network identifiers (e.g., fingerprint snapshots) with one or more stored network identifiers.

Figure 10:
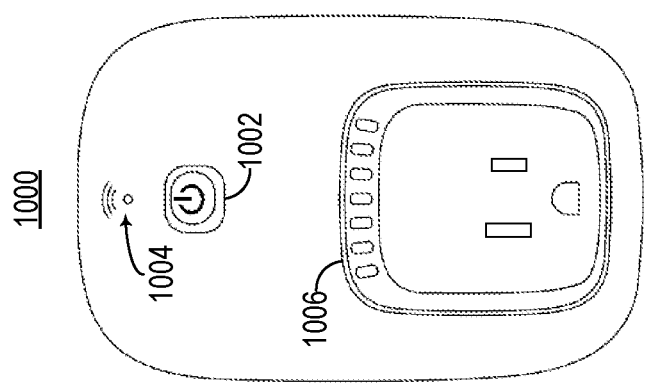
FIG. 10 is an illustration of an example of a front view of a network device, in accordance with an embodiment.
Figure 11:
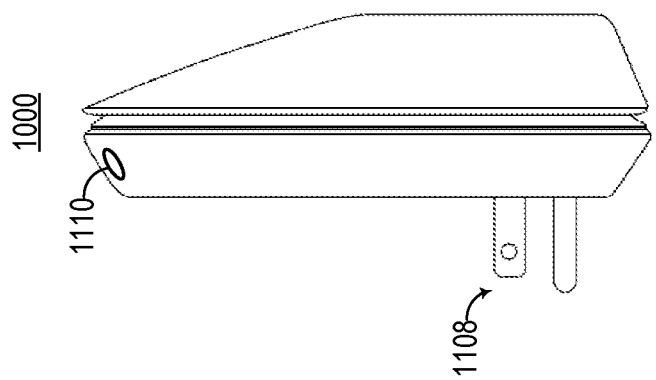
FIG. 11 is an illustration of an example of a side view of a network device, in accordance with an embodiment.

FIG. 10 illustrates an example of a front view of a network device 1000. FIG. 11 illustrates an example of a side view of the network device 1000. The network device 1000 may include any of the network devices 102, 104, or 106 described herein. In some embodiments, the network device 1000 may be a home automation network device. For example, the network device 1000 may include a home automation switch that may be coupled with a home appliance. A user may wirelessly access the network device 1000 in order to access, control, and/or configure various home appliances located within the user's home. For instance, the user may remotely control appliances such as a television, radio, light, microwave, iron, space heater, wall A/C unit, washer, dryer, fan, and/or the like.

In some embodiments, the network device 1000 may include a WiFi enabled switch that connects home appliances and other electronic devices to a compatible 802.11b/g/n/ac WiFi network. The network device 1000 may thus allow users to locally or remotely turn devices on or off from anywhere, program customized notifications, and/or change device status. The network device 1000 may further allow a user to create custom schedules or have devices respond to sunrise or sunset.

The network device 1000 includes a power switch or power button 1002 that may be depressed in order to turn the network device 1000 on and off. In some embodiments, a light source may be integrated with or located behind the power switch. For example, a light-emitting diode (LED) may be located on a circuit board under the power button 1002. The light source may be illuminated when the network device 1000 is powered on, and may not be illuminated when the network device 1000 is powered off.

The network device 1000 further includes a communications signal indicator 1004. The signal indicator 1004 may indicate whether the network device 1000 has access to a communications signal, such as a WiFi signal. For example, the signal indicator 1004 may include a light source (e.g., a LED) that illuminates when the network device 1000 is connected to a communications signal. The light source may depict different colors or other characteristics (e.g., flashing, dimming, or the like) to indicate different levels of signal strength or mode of operation.

The network device 1000 includes a restore button 1110. The restore button 1110 may allow a user to reset the network device 1000 to factory default settings. For example, upon being depressed, the restore button 1110 may cause all software on the device to be reset to the settings that the network device 1000 included when purchased from the manufacturer.

The network device 1000 further includes a plug 1008 and an outlet 1006. The plug 1008 allows the network device 1000 to be plugged into a wall socket, such as a socket providing 120V, 220V, or the like. In turn, an appliance may be plugged into the outlet 1006. Once the network device 1000 is registered according to the techniques described above, an appliance plugged into the socket 1006 may be controlled by a user using an access device (e.g., access device 108).

Figure 12:
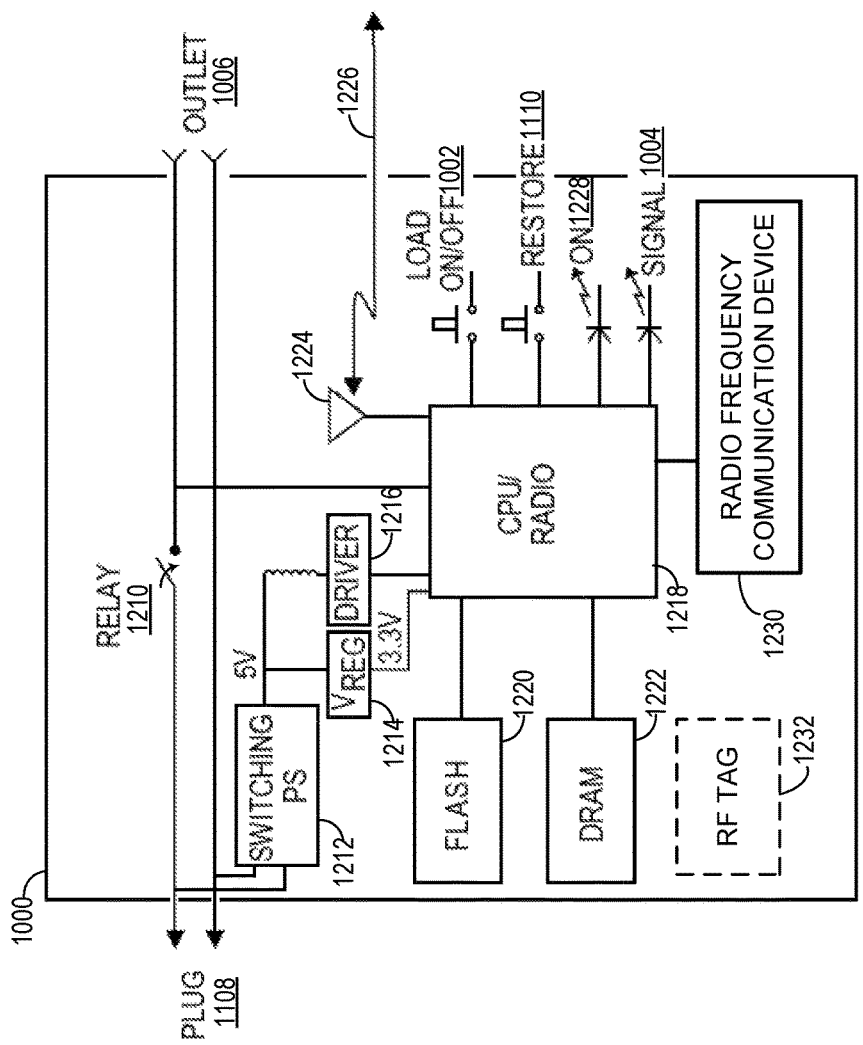
FIG. 12 is an example of a block diagram of a network device, in accordance with an embodiment.

FIG. 12 is an example of a block diagram of the network device 1000 depicting different hardware and/or software components of the network device 1000. As described above with respect to FIGS. 10 and 11, the network device 1000 includes the outlet 1006, the plug 1008, the power button 1002, the restore button 1110, and the communications signal indicator 1004. The network device 1000 also includes light source 1228 associated with the power button 1002. As previously described, the light source 1228 may be illuminated when the network device 1000 is powered on.

The network device 1000 further includes a relay 1210. The relay 1210 is a switch that controls whether power is relayed from the plug 1008 to the outlet 1006. The relay 1210 may be controlled either manually using the power button 1002 or remotely using wireless communication signals. For example, when the power button 1002 is in an ON position, the relay 1210 may be closed so that power is relayed from the plug 1008 to the outlet 1006. When the power button 1002 is in an OFF position, the relay 1210 may be opened so that current is unable to flow from the plug 1008 to the outlet 1006. As another example, an application or program running on an access device may transmit a signal that causes the relay 1210 to be opened or closed. For instance, an access application may display a graphical interface on the access device that includes a power button. The user may tap or otherwise select the power button, and the access application may send a communication signal (e.g., over a WiFi network) to the network device 1000 instructing the network device 1000 to open or close the relay 1210.

The network device 1000 further includes flash memory 1220 and dynamic random access memory (DRAM) 1222. The flash memory 1220 may be used to store instructions or code relating to an operating system, one or more applications, and any firmware. The flash memory 1220 may include nonvolatile memory so that any firmware or other program can be can updated. In the event the network device 1000 loses power, information stored in the flash memory 1220 may be retained. The DRAM 1222 may store various other types of information needed to run the network device 1000, such as all runtime instructions or code.

The network device 1000 further includes a CPU/Radio 1218. The CPU/Radio 1218 controls the operations of the network device 1000. For example, the CPU/Radio 1218 may execute various applications or programs stored in the flash memory 1220 and/or the dynamic random access memory (DRAM) 1222. The CPU/Radio 1218 may also receive input from the various hardware and software components, interpret the input, and perform one or more functions in response to the input. As one example, the CPU/Radio 1218 may determine whether the power button 1002 has been pressed, and determines whether the relay 1210 needs to be opened or closed. The CPU/Radio 1218 may further perform all communications functions in order to allow the network device 1000 to communicate with other network devices, one or more gateways, a cloud network, and/or one or more access devices. While the CPU and radio of the network device 1000 are shown to be combined in the CPU/Radio 1218, one of ordinary skill in the art will appreciate that, in some embodiments, the CPU and radio may be separately located within the network device 1000. For example, CPU circuitry may be situated at a separate location on a circuit board from the location of radio circuitry, the CPU circuitry may be located on a different circuit board from the radio circuitry, or the like.

The network device 1000 may communicate with other devices and/or networks via antenna 1224. For example, antenna 1224 may include a 2.4 GHz antenna, a 5 GHz antenna, or the like, that can transmit and receive WiFi communications signals. The antenna 1224 may include other types of antennas that can communicate Bluetooth® signals, Zigbee® signals, Ultra-Wideband (UWB) signals, and/or the like. In some embodiments, the network device 1000 may include multiple antennas for communicating different types of communication signals. As one example, the network device 1000 may include both a 2.4 GHz antenna and a 5 GHz antenna.

The network device 1000 further includes a driver 1216, a switching power supply 1212, and a voltage regulator 1214. The driver 1216 may include instructions or code that can be used to translate control signals or commands received from applications running on the DRAM 1222 to commands that the various hardware components in the network device 1000 can understand. In some embodiments, the driver 1216 may include an ambient application running on the DRAM 1222. The switching power supply 1212 may be used to transfer power from the outlet in which the plug 1008 is connected to the various loads of the network device 1000 (e.g., CPU/Radio 1218). The switching power supply 1212 may efficiently convert the voltage and current characteristics of the electrical power to a level that is appropriate for the components of the network device 1000. For example, the switching power supply 1212 may perform AC-DC conversion. In some embodiments, the switching power supply 1212 may be used to control the power that is relayed from the plug 1008 to the outlet 1006. The voltage regulator 1214 may be used to convert the voltage output from the switching power supply 1212 to a lower voltage usable by the CPU/Radio 1218. For example, the voltage regulator 1214 may regulate the DC voltage from 5V to 3.3V.

In various embodiments, functions may be stored as one or more computer-program products, such as instructions or code, in a non-transitory machine-readable storage medium, such as the flash memory 1220 and/or the DRAM 1222. The network device 1000 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 2, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 2. The memory, such as the flash memory 1220 and/or the DRAM 1222, may be a processor-readable memory and/or a computer-readable memory that stores software code (programming code, instructions, etc.) configured to cause a processor(s) within the CPU/Radio 1218 to perform the functions described. In other embodiments, one or more of the functions described may be performed in hardware.

A set of these instructions and/or code might be stored on a non-transitory machine-readable storage medium, such as the flash memory 1220 and/or the DRAM 1222. In some cases, the storage medium might be incorporated within a computer system, such as the CPU/Radio 1218. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 1000 and/or might take the form of source and/or installable code, which, upon compilation and/or installation on the network device 1000 (e.g., using any of a variety of generally available compilers, installation programs, compression/decompression utilities, etc.) then takes the form of executable code.

The network device 1000 includes a radio frequency communication device 1230 coupled to the CPU/radio 1218. The radio frequency communication device 1230 may employ radio frequency identification technology, such as near field communication (NFC) technology or Bluetooth™ low energy technology, for example, to receive configuration information with respect to the network device 600. This configuration information may include a service set identifier (SSID) network name, an SSID network password, a network device username, and/or a network device user password.

The network device 1000 may optionally include a removeable radio frequency (RF) tag 1232 in wireless communication with the radio frequency communication device 1230. In use, the RF tag 1232 may be removed from network device 1000 and placed within direct communication range of another network device, as described further herein. Thus, RF tag 1232 may transfer the configuration information, including the SSID name, SSID password, network device username, and/or network device password, to another network device directly by using radio frequency identification technology, i.e., without the use of a gateway, WiFi™ or wide area network (WAN).

It should be appreciated that the network device 1000 may have other components than those depicted in FIGS. 10-12. Further, the embodiment shown in the figures are only one example of a network device that may incorporate an embodiment of the invention. In some other embodiments, network device 1000 may have more or fewer components than shown in the figure, may combine two or more components, or may have a different configuration or arrangement of components.

Figure 13:
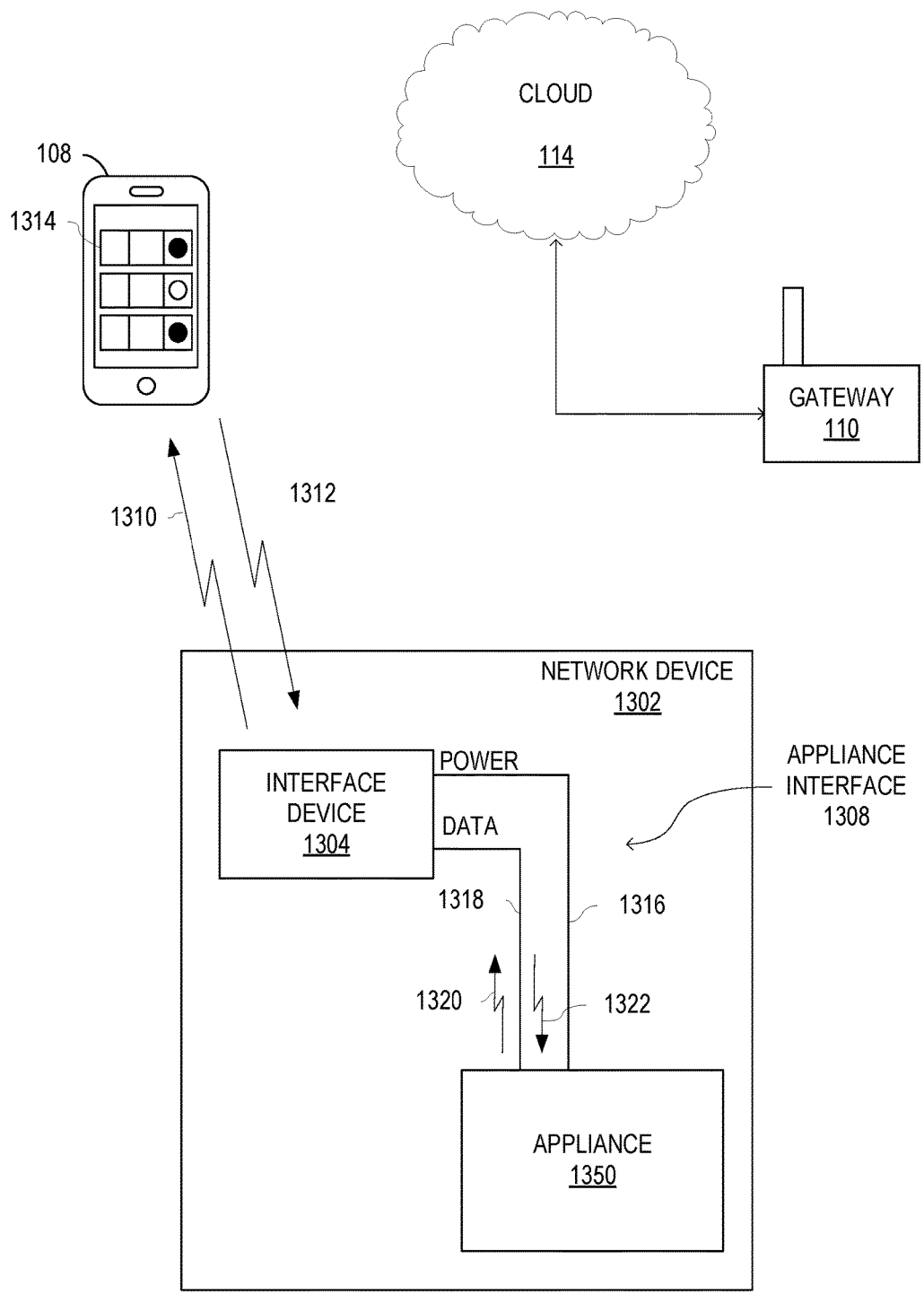
FIG. 13 is a schematic illustration of a local area network including a network device that includes an appliance, in accordance with an embodiment.

FIG. 13 is a schematic illustration of a local area network 1300 including a network device 1302 that includes an appliance 1350. The network device 1302 can comprise an interface device 1304 and the appliance 1350 connected by an appliance interface 1308. The appliance interface 1308 can include a data connection 1318 and a power connection 1316. The data connection 1318 can be a serial connection (e.g., RS-232, USB, or other), or any other suitable data connection. The interface device 1304 can be fully powered by the appliance 1302 through the power connection 1316, or can have a separate source of power.

The appliance 1350 can be any suitable electric device, such as a crock pot, space heater, an iron, a washing machine, a dishwasher, a lamp, a radio, a computer, an amplifier, or another electrical device. Additional examples of suitable electrical devices include electrical devices incorporated into or with non-electrical devices, such as an actuator system in an electrically-actuated deadbolt, a sensing system in a seat cushion, or other suitable electrical device incorporated into or with a non-electrical device. The appliance 1350 can be adapted to operate with the interface device 1304. The appliance 1350 can be any finite state machine. The appliance 1350 can, but need not, know or store one or more states related to the appliance. For example, the appliance 1350 may know or store data related to whether the appliance 1350 is turned on, how long the appliance has been on (or off), among other status data.

The interface device 1304 can be positioned within the housing of the appliance 1350, or can be attached externally to the appliance 1350. The interface device 1304 can be removable from the appliance 1350, or can be permanently installed in or on the appliance 1350.

The interface device 1304 can be connected to the local area network 1300 through a network interface. The interface device 1304 can be connected by a wired or wireless connection (e.g., WiFi, Zigbee®, or others described herein or well known). In some embodiments, the interface device 1304 can be connected directly to the cloud network 114 through a cellular internet connection (e.g., EDGE, LTE, or others).

The interface device 1304 can communicate with another network device, an access device 108, or another client device through the network interface 1306. The interface device 1304 can transmit a status information signal 1310 with status information to the access device 108, and the access device 108 can transmit a network device control signal 1312 to the interface device 1304. The status information signal 1310 and the network device control signal 1312 can be transmitted between the interface device 1304 and the access device 108 using a telecommunications network (e.g., a cellular network, or other suitable broadband network), using a local area network 1300 (e.g., through a gateway 110), or using the cloud network 114, although such a signal may pass through an intermediary device or network to do so.

The interface device 1304 can interpret the network device control signal 1312 and perform actions based on the contents of the network device control signal 1312. The network device control signal 1312 can include commands that can be performed by the interface device 1304 itself. The network device control signal 1312 can also include commands that are to be performed by the appliance 1350. Commands that are to be performed by the appliance 1350 can include commands like turn on or off, set a desired temperature (e.g., heat up or cool down to 215° F. or any other temperature), or other suitable commands depending on the particular appliance. The interface device 1304 can interpret the network device control signal 1312 and can send out a command 1322, through the data connection 1318 of the appliance interface 1308, based on the network device control signal 1312. The appliance 1350 can then perform the command indicated in the network device control signal 1312.

The interface device 1304 can also transmit commands to the appliance 1350 that are not based on a network device control signal received from the access device 108, but are rather based on programming in the interface device 1304. Examples of such commands can include commands to update a communication rate, commands to check a state of the appliance 1350, commands to set or get a clock time of the appliance 1350, or any other suitable commands.

The interface device 1304 can receive, through the data connection 1318 of the appliance interface 1308, a response (e.g., response 1320) to any command from the appliance 1350. In some examples, the response 1320 can include an indication that the command 1322 was received. In some examples, the response may include only an indication that a command is received (e.g., an ACK). In some examples, the response 1320 can include information for some value on the appliance 1350, such as an "on/off" state, a serial number, a product identification, a manufacturer identification, a temperature, a time since live, a setting, or any other value retrievable from the appliance 1350. The interface device 1304 can interpret the value and can send information about the value (e.g., the state of the appliance is "on," the temperature of the appliance, the time since the appliance first turned on, or other information) as status information (e.g. using status information signal 1310) to the access device 108. Additionally, the interface device 1304 can send status information about itself (e.g., time since live, supplied power, signal strength, and others) as status information (e.g. using status information signal 1310) to the access device 108.

The interface device 1304 can also use responses (e.g., response 1320) from the appliance 1350 to perform additional functions at the interface device 1304, such as error handling. In some cases, when performing the additional functions, the interface device 1304 does not transmit any status information 1310 to the access device 108 based on those particular responses.

The access device 108 can include one or more interface module or tiles (e.g., tile 1314) for displaying information and controls corresponding to the network device 102.

In some embodiments, the interface device 1304 can transmit a heartbeat command (e.g., command 1322) over the data connection 1318 to the appliance 1302 to determine whether the appliance 1350 is working properly and/or in a state of readiness. If the interface device 1304 determines that the appliance 1350 has had some sort of failure (e.g., the appliance 1350 sends a response 1320 indicating a failure or the interface device 1304 does not receive any response 1320), the interface device 1304 can take corrective action (e.g., restarting the appliance 1350 or an element of the appliance 1350), can log the event, or can alert the user).

Figure 14:
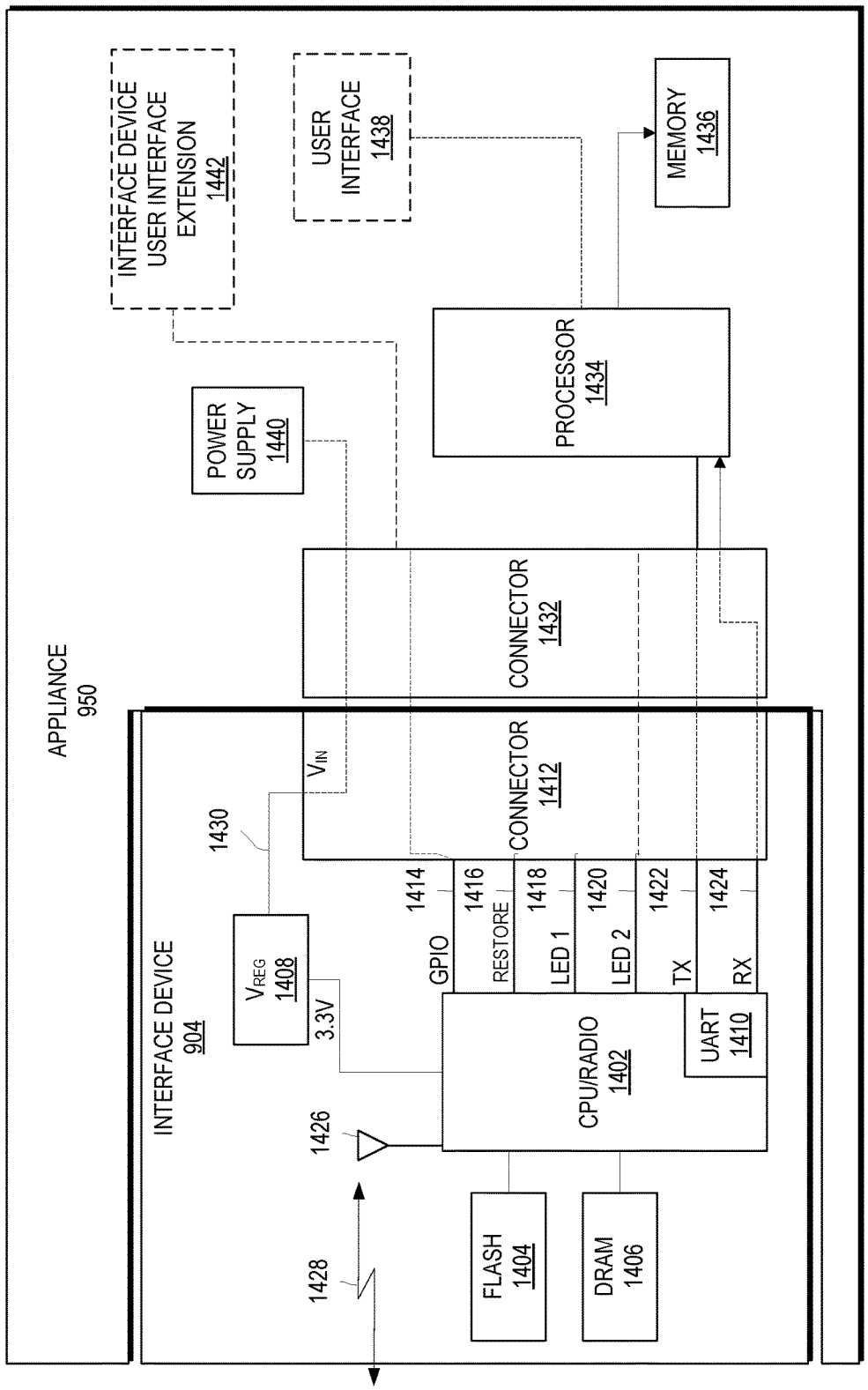
FIG. 14 is an example of a block diagram of a network device including an interface device attached to an appliance, in accordance with an embodiment.

FIG. 14 depicts a block diagram of a network device including an interface device 1304 attached to an appliance 1350 according to one embodiment. The interface device 1304 can include connector 1412 that interacts with connector 1432 of the appliance 1350.

The interface device 1304 can include flash memory 1404 and dynamic random access memory (DRAM) 1406. The flash memory 1404 may be used to store instructions or code relating to an operating system, one or more applications, and any firmware. The flash memory 1404 can be used to store a cache. The flash memory 1404 may include non-volatile memory so that any firmware or other program can be can updated. In the event the interface device 1304 loses power, information stored in the flash memory 1404 may be retained. The DRAM 1406 may store various other types of information needed to run the interface device 1304, such as all runtime instructions or code. The flash memory 1404 or DRAM 1406 or a combination thereof may include all instructions necessary to communicate with an appliance 1350, including all instructions necessary to communicate using the appliance serial protocol disclosed herein.

The interface device 1304 further includes a CPU/Radio 1402. The CPU/Radio 1402 can control the operations of the interface device 1304. For example, the CPU/Radio 1402 may execute various applications or programs stored in the flash memory 1404 and/or the dynamic random access memory (DRAM) 1406. The CPU/Radio 1402 may also receive input from the appliance 1350, interpret the input, and perform one or more functions in response to the input. The CPU/Radio 1402 may further perform all communications functions in order to allow the interface device 1304 to communicate with other network devices, one or more gateways, a cloud network, and/or one or more access devices. The interface device 1304 may communicate with other devices and/or networks via antenna 1426. For example, antenna 1426 may include a 2.4 GHz antenna that can transmit and receive WiFi communications signals 1428. The antenna 1426 may include other types of antennas that can communicate Bluetooth® signals, Zigbee® signals, Ultra-Wideband (UWB) signals, and/or the like. In some embodiments, the interface device 1304 may include multiple antennas for communicating different types of communication signals.

The CPU/Radio 1402 can include at least one universal asynchronous receiver/transmitter (UART) 1410. The CPU/Radio 1303 can use the UART 1410 to send and receive serial communications. The CPU/Radio 1303 can send data through a transmit line 1422 and a receive data through a receive line 1424. The CPU/Radio 1303 can send and receive data through the transmit line 1422 and receive line 1424 using a serial protocol, such as RS232. The CPU/Radio 1402 can also include an input/output (GPIO) line 1414, a restore line 1416, an LED 1 line 1418, and an LED 2 line 1420. The CPU/Radio 1402 can have additional or fewer lines as necessary. The GPIO line 1414 can be used for any suitable function, such as powering an indicator light on an appliance 1350 or accepting an input from the appliance 1350. A signal sent on the restore line 1416 can be used to restore the CPU/Radio 1402 and/or the interface device 1304 to factory defaults. The LED 1 line 1418 and LED 2 line 1420 can be used to power first and second LEDs that can be used to indicate various statuses, such as whether the interface device has a network connection and whether the interface device is powered on.

The interface device 1304 further includes a voltage regulator 1408. The voltage regulator 1408 may be used to convert the voltage output from the appliance 1350 to a voltage usable by the CPU/Radio 1402. For example, the voltage regulator 1408 may regulate the DC voltage from 5V to 3.3V. The voltage regulator 1408 can be supplied with power from a power line 1430.

Each of the interface lines, including the GPIO line 1414, the restore line 1416, the LED 1 line 1418, the LED 2 line 1420, the transmit line 1422, the receive line 1424, the power line 1430, and any additional lines, can be routed through connector 1412. Connector 1412 can be a proprietary or universal connector. Any appliance 1350 to which the interface device 1304 is attached through the connector 1412 can have the necessary hardware to make use of the interface lines, such as to provide power to the power line 1430 and to provide the first and second LEDs that are driven by the LED 1 line 1418 and LED 2 line 1420.

In alternate embodiments, some interface lines are not routed through the connector 1412. For example, the power line 1430 can be routed to a power supply attached directly to the interface device 1304, and the LED 1 line 1418 and LED 2 line 1420 can be routed to first and second LEDs located within the interface device 1304.

In various embodiments, functions may be stored as one or more instructions or code in memory, such as the flash memory 1404 and/or the DRAM 1406. The interface device 1304 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed below may be implemented as code and/or instructions executable by a computer (and/or a processor within a computer); in an aspect, then, such code and/or instructions can be used to configure and/or adapt a device (e.g. a specialty computer) to perform one or more operations in accordance with the described methods. Such functions or code may include code to perform various steps described below. The memory, such as the flash memory 1404 and/or the DRAM 1406, may be a processor-readable memory and/or a computer-readable memory that stores software code (programming code, instructions, etc.) configured to cause a processor(s) within the CPU/Radio 1402 to perform the functions described. In other embodiments, one or more of the functions described may be performed in hardware.

A set of these instructions and/or code might be stored on a computer-readable storage medium, such as the flash memory 1404 and/or the DRAM 1406. In some cases, the storage medium might be incorporated within a computer system, such as the CPU/Radio 1402. In other embodiments, the storage medium might be separate from a computer system (e.g., a removable medium, such as a compact disc), and/or provided in an installation package, such that the storage medium can be used to program, configure and/or adapt a device (e.g. a computer) with the instructions/code stored thereon. These instructions might take the form of executable code, which is executable by the interface device 1304 and/or might take the form of source and/or installable code, which, upon compilation and/or installation on the interface device 1304 (e.g., using any of a variety of compilers, installation programs, compression/decompression utilities, etc.) then takes the form of executable code.

Figure 15:
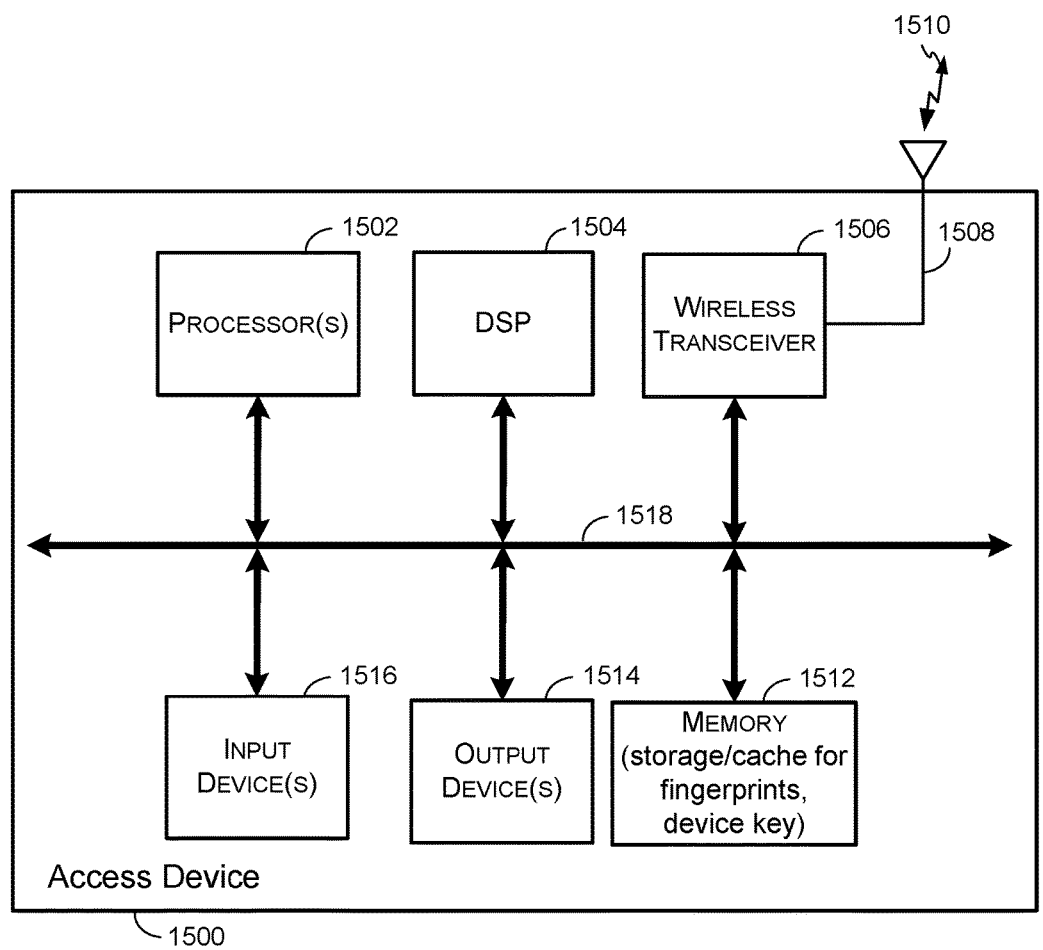
FIG. 15 is a block diagram illustrating an example of an access device, in accordance with some embodiments.

FIG. 15 illustrates an example of an access device 1500. The access device 1500 may include any human-to-machine interface with network connection capability that allows access to a network. For example, the access device 1500 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 1500 includes hardware elements that can be electrically coupled via a bus 1518 (or may otherwise be in communication, as appropriate). In one embodiment, the bus 1518 can be used for the processor(s) 1502 to communicate between cores and/or with the memory 1512. As shown in the example of FIG. 15, the memory 1512 can be used to as a cache to store network identifiers (e.g., network fingerprints) and a device key or security key for access device 1500. As discussed above with reference to FIG. 6, a cache 602 stored locally at access device 1500 in memory 1512 can store network fingerprints taken at different points in time. In one example, memory 1512 can be used as storage for cache 602, where cache 602 stores network fingerprints and timestamps that reflect known network devices. The access device 1500 uses the records in cache 602 stored in memory 1512 to determine that access device 1500 is associated with the same network as a given network device.

The hardware elements may include one or more processors 1502, including without limitation one or more general-purpose processors and/or one or more special-purpose processors (such as digital signal processing chips, graphics acceleration processors, and/or the like); one or more input devices 1516, which can include without limitation a camera, a mouse, a keyboard, a touch sensitive screen, a touch pad, a keypad, and/or the like; and one or more output devices 1514, which can include, without limitation, a display, a printer, and/or the like.

The access device 1500 may include one or more wireless transceivers 1506 connected to the bus 1518. The wireless transceiver 1506 may be operable to receive wireless signals (e.g., signal 1510) via antenna 1508. The wireless signal 1510 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 1506 may be configured to receive various radio frequency (RF) signals (e.g., signal 1510) via antenna 1508 from one or more gateways, network devices, other access devices, cloud networks, and/or the like. Access device 1500 may also be configured to decode and/or decrypt, via the DSP 1504 and/or processor(s) 1502, various signals received from one or more gateways, network devices, other access devices, cloud networks, and/or the like.

The access device 1500 may further include (and/or be in communication with) one or more non-transitory machine-readable storage mediums or storage devices (e.g., memory 1512), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1512, such as RAM, ROM, FLASH, or disc drive, and executed by processor(s) 1502 or DSP 1504. The access device 1500 can also comprise software elements (e.g., located within the memory 1512), including, for example, an operating system, device drivers, executable libraries, and/or other code, such as one or more application programs, which may comprise computer programs implementing various functions. Memory 1512 may be a non-transitory machine-readable storage medium, processor-readable memory, and/or a computer-readable memory that stores the one or more computer-program products configured to cause the processor(s) 1502 and/or DSP 1504 to perform the various functions. In other embodiments, the various functions described may be performed in hardware.

Figure 16:
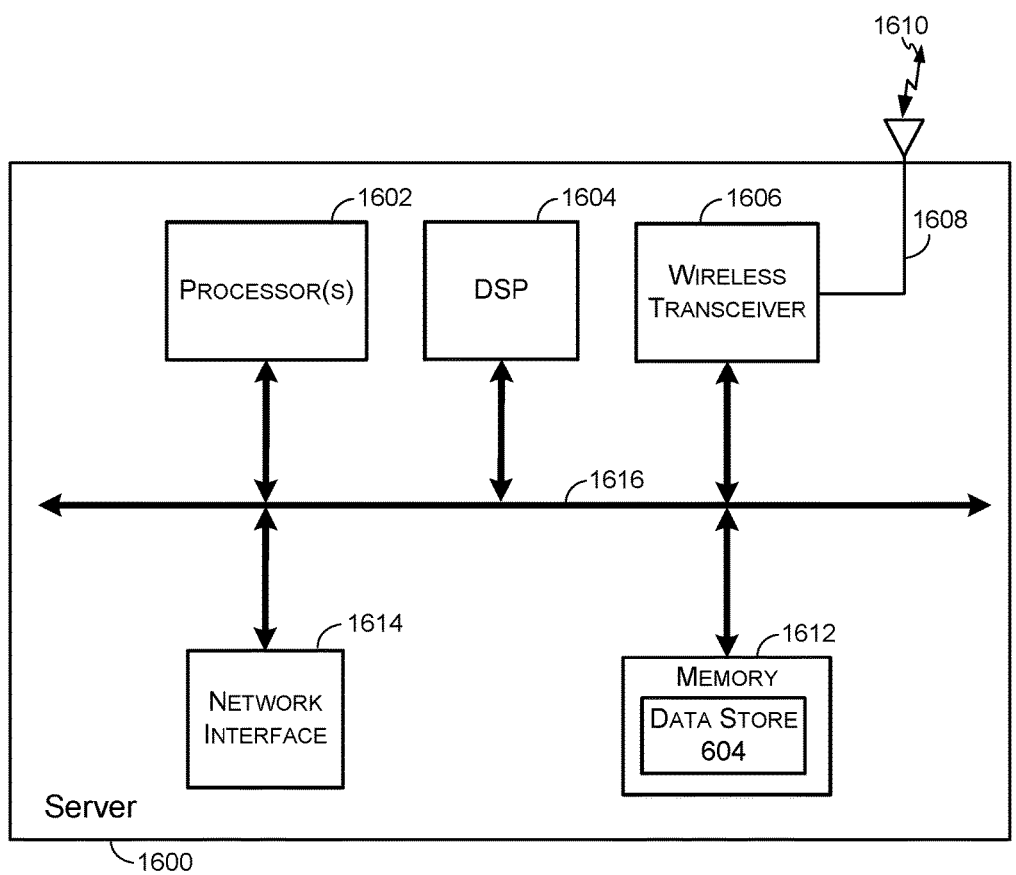
FIG. 16 is a block diagram illustrating an example of a server, in accordance with some embodiments.

FIG. 16 illustrates an example of a server 1600. The server 1600 includes hardware elements that can be electrically coupled via a bus 1616 (or may otherwise be in communication, as appropriate). In one embodiment, the bus 1616 can be used for the processor(s) 1602 to communicate between cores and/or with the memory 1612. The hardware elements may include one or more processors 1602, including without limitation one or more general-purpose processors and/or one or more special-purpose processors (such as digital signal processing chips, graphics acceleration processors, and/or the like), memory 1612, DSP 1604, a wireless transceiver 1606, a bus 1616, and antenna 1608. Furthermore, in addition to the wireless transceiver 1606, server 1600 can further include a network interface 1614 to communicate with a network (e.g., a local area network, a network of a preferred carrier, Internet, etc.).

The server 1600 may further include (and/or be in communication with) one or more non-transitory machine-readable storage mediums or storage devices (e.g., memory 1612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. As shown in the example of FIG. 16, the memory 1612 can be used to store data store 604. As discussed above with reference to FIG. 6, data store 604 can store network fingerprints taken at different points in time. In one example, data store 604 can be a fingerprint database where each record in the database includes a network fingerprint and is identified by a timestamp indicating when the fingerprint was created. In one embodiment, the fingerprints stored in data store 604 can be hash values generated by executing a cryptographic hash function.

In various embodiments, functions may be stored as one or more one or more computer-program products, such as instructions or code, in memory 1612. The server 1600 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 2 and 6-9. The memory 1612 may be a non-transitory machine-readable storage medium, processor-readable memory, and/or a computer-readable memory that stores the one or more computer-program products configured to cause the processor(s) 1602 to perform the functions described. In other embodiments, one or more of the functions described may be performed in hardware.

A set of these instructions and/or code might be stored on a non-transitory machine-readable storage medium, such as the memory 1612. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 1600 and/or might take the form of source and/or installable code, which, upon compilation and/or installation on the server 1600 (e.g., using any of a variety of generally available compilers, installation programs, compression/decompression utilities, etc.) then takes the form of executable code.

Figure 17:
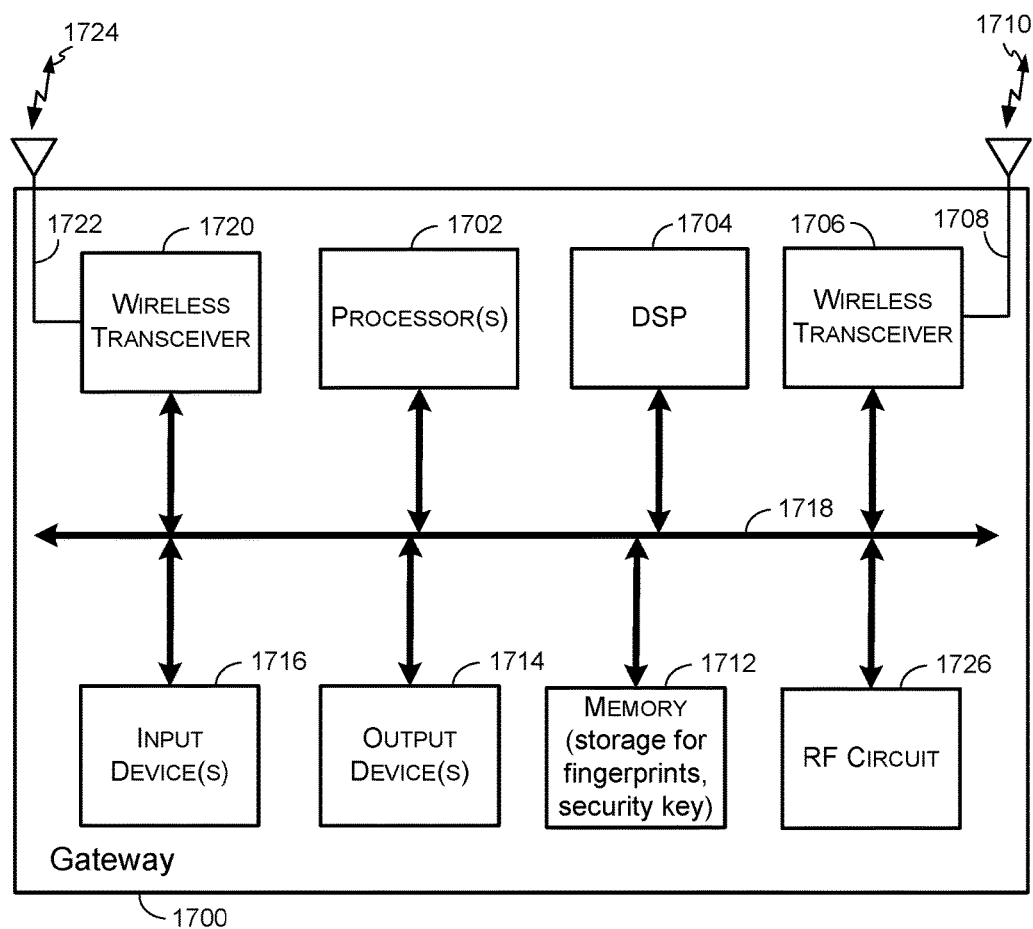
FIG. 17 is a block diagram illustrating an example of a gateway, in accordance with some embodiments.

FIG. 17 illustrates an example of a gateway 1700. The gateway 1700 may include a range extending device, a router, an access point, a modem, and/or any other device that provides network access among one or more computing devices and/or external networks. For example, the gateway 1700 may include a router gateway with access point and router functionality, and may further include an Ethernet switch and/or a modem. As another example, the gateway 1700 may include a range extending gateway that may be used to improve signal range and strength within a network by taking an existing signal from another gateway (e.g., a router gateway, an access point, or the like) and rebroadcasting the signal to create a second logical network.

The gateway 1700 includes hardware elements that can be electrically coupled via a bus 1718 (or may otherwise be in communication, as appropriate). In one embodiment, the bus 1718 can be used for the processor(s) 1702 to communicate between cores and/or with the memory 1712. As shown in the example of FIG. 17, the memory 1712 can be used to store one or more network identifiers (e.g., network fingerprints taken at different times) and a security key for gateway 1700. The hardware elements may include one or more processors 1702, including without limitation one or more general-purpose processors and/or one or more special-purpose processors (such as digital signal processing chips, graphics acceleration processors, and/or the like); one or more input devices 1716, which can include without limitation one or more buttons, a keyboard, a keypad, a touch sensitive screen, a touch pad, and/or the like; and one or more output devices 1714, which can include, without limitation, a display, light or sound indicators, and/or the like.

The gateway 1700 may include one or more wireless transceivers 1706 and 1720 connected to the bus 1718. The wireless transceiver 1706 may be operable to receive wireless signals (e.g., a wireless signal 1710) via an antenna 1708. The wireless transceivers 1720 may be operable to receive wireless signals (e.g., a wireless signal 1714) via an antenna 1722. The wireless transceivers 1706 and 1720 may each include a WiFi transceiver radio designed to transmit and receive signals using frequencies of a specific frequency band, which may be referred to herein as "WiFi circuits." For example, wireless transceiver 1706 may include a 2.4 GHz WiFi circuit, and wireless transceiver 1720 may include a 5 GHz WiFi circuit. Accordingly, the gateway 1700 may include a single WiFi circuit for a first WiFi frequency band, and a single WiFi circuit for a second WiFi frequency band. In some embodiments, the gateway 1700 may include multiple wireless transceivers (not shown) for each available frequency band. The antennas 1708 and 1722 may include multiple band antennas that can transmit and/or receive signals over different frequency bands.

The gateway 1700 may further include radio frequency (RF) circuit 1726. In some embodiments, the wireless transceivers 1706 and 1720 may be integrated with or coupled to the RF circuit 1726 so that the RF circuit 1726 includes the wireless transceivers 1706 and 1720. In some embodiments, the wireless transceivers 1706 and 1720 and the RF circuit 1726 are separate components. The RF circuit 1726 may include a RF amplifier that may amplify signals received over antennas 1708 and 1722. The RF circuit 1726 may also include a power controller that may be used to adjust signal amplification by the RF amplifier. The power controller may be implemented using hardware, firmware, software, or any combination thereof.

The wireless signals 1710 and 1724 may be transmitted via a wireless network. In some embodiments, the wireless network may be any wireless network such as a wireless local area network (e.g., local area network 100), such as WiFi™, a Personal Access Network (PAN), such as Bluetooth® or Zigbee®, or a cellular network (e.g. a GSM, WCDMA, LTE, CDMA2000 network). Wireless transceivers 1706 and 1720 may be configured to receive various radio frequency (RF) signals (e.g., signals 1710 and 1724) via antennas 1708 and 1722, respectively, from one or more other gateways, access devices, network devices, cloud networks, and/or the like. Gateway 1700 may also be configured to decode and/or decrypt, via the DSP 1704 and/or processor(s) 1702, various signals received from one or more gateways, network devices, cloud networks, and/or the like.

The gateway 1700 may include a power supply (not shown) that can power the various components of the gateway 1700. The power supply may include a switch-mode power supply, a linear power supply, a push-pull power supply, or any other suitable type of power supply. In some embodiments, the gateway 1700 may include multiple power supplies. For example, a switch-mode power supply may be used to condition input power, and a linear power supply may be used to power the RF circuit 1726. The power supply may be configured to operate over various ranges of appropriate input voltages.

The gateway 1700 may further include (and/or be in communication with) one or more non-transitory machine-readable storage mediums or storage devices (e.g., memory 1712), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1712, such as RAM, ROM, FLASH, or disc drive, and executed by processor(s) 1702 or DSP 1704. The gateway 1700 can also comprise software elements (e.g., located within the memory 1712), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 2, 6-9, and 22 may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 2 and 6-9 and below with respect to FIG. 22. The memory 1712 may be a non-transitory machine-readable storage medium, processor-readable memory, and/or a computer-readable memory that stores the one or more computer-program products configured to cause the processor(s) 1702 to perform the functions described. In other embodiments, one or more of the functions described may be performed in hardware.

A set of these instructions and/or code might be stored on a non-transitory machine-readable storage medium, such as the memory 1712. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 1700 and/or might take the form of source and/or installable code, which, upon compilation and/or installation on the gateway 1700 (e.g., using any of a variety of generally available compilers, installation programs, compression/decompression utilities, etc.) then takes the form of executable code.

Figure 18:
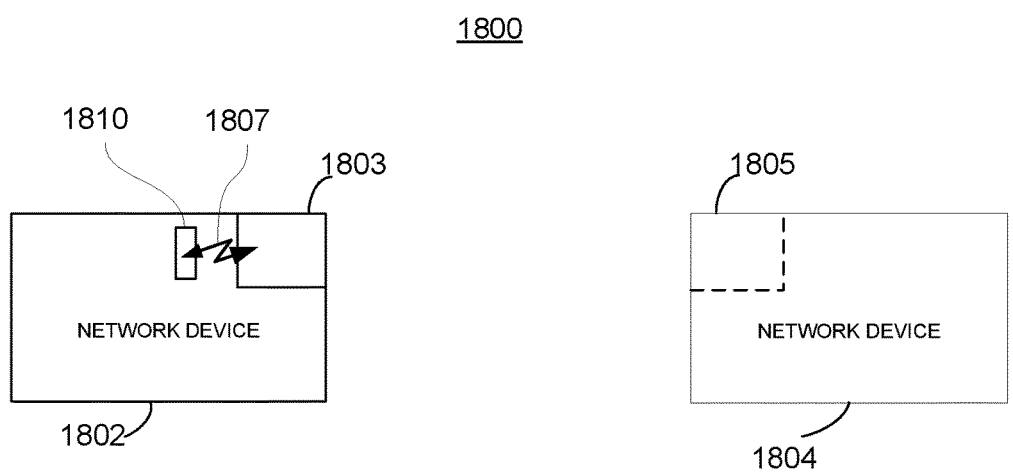
FIG. 18 is an illustration of an example of a wireless network environment, in accordance with some embodiments.
Figure 19:
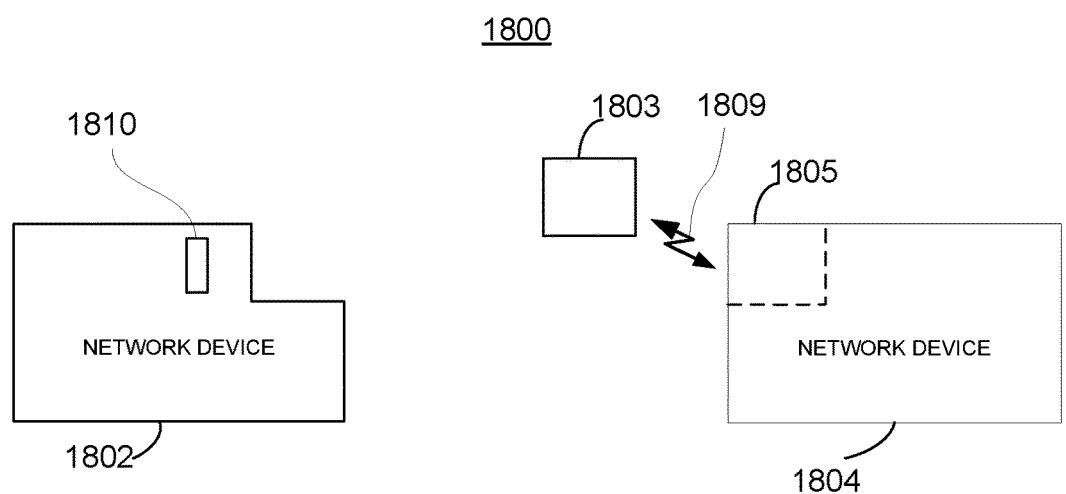
FIG. 19 is an illustration of another example of a wireless network environment, in accordance with some embodiments.

FIGS. 18 and 19 illustrate network devices 1802, 1804 that are in radio frequency communication range of each other. The network devices 1802 and 1804 may include any of the network devices 102, 104, 106, or 1000 described herein. The network device 1802 includes a radio frequency communication device 1810, such as an antenna, in communication 1807 with an optionally removable RF tag 1803. The radio frequency communication device 1810 receives configuration information, such as wireless network access information (e.g., an SSID network name, SSID password, network device username, and/or network device password)

from a user. The radio frequency communication device 1810 transfers this information via communication link 1807 to RF tag 1803.

As shown in FIG. 19, RF tag 1803 may be removable from network device 1802 to be placed in proximity of network device 1804 and radio frequency communication device 1805, in order to establish a direct connection 1809 between RF tag 1803 and radio frequency communication device 1805. The direct connection 1809 may be established using radio frequency communication technology, such as near field communication (NFC) technology, Bluetooth™ technology, or Bluetooth™ low energy technology. In the case of NFC technology, the RF tag 1803 may be placed within 0.2 meters or less of radio frequency communication device 1805 in order to establish the direct connection 1809. In the case of Bluetooth™ low energy technology, the RF tag 1803 may be placed within 50 meters or less of radio frequency communication device 1805 in order to establish the direct connection 1809. As used herein, a "direct connection" is a connection between two or more network devices with no intervening devices or components.

Once the direct connection 1809 is established between the RF tag 1803 of the network device 1802 and the radio frequency communication device 1805 of the network device 1804, the configuration information stored on the RF tag 1803 can be transmitted from the RF tag 1803 of the network device 1802 to the radio frequency communication device 1805 of the network device 1804. The configuration information can be used to configure network device 1804 with wireless network access information, such as the SSID name, SSID password, network device username, and/or network device password associated with the network device 1802.

In other words, the user may place the RF tag 1803 in proximity to the radio frequency communication device 1805 of the network device 1804 in order to configure the network device 1804. No further action from the user is necessary to configure network device 1804 with the same configuration information as network device 1802. Once network device 1804 is configured, it may then be used to configure other network devices in direct communication range in a similar manner to that described above.

Figure 20:
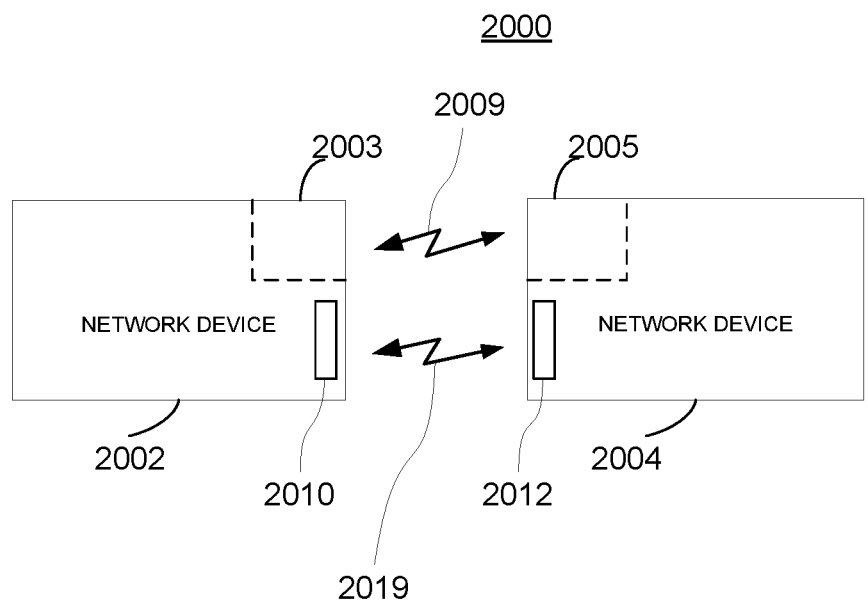
FIG. 20 is an illustration of another example of a wireless network environment, in accordance with some embodiments.

FIG. 20 illustrates network devices 2002, 2004 in radio frequency communication of each other. The network devices 2002 and 2004 may include any of the network devices 102, 104, 106, or 1000 described herein. As shown in FIG. 20, network devices 2002, 2004 have radio frequency communication devices 2003, 2005, respectively, in direct communication 2009 with each other. Network devices 2002, 2004 further have induction coils 2010, 2012, respectively, in communication 2019 with each other. In this example, it is assumed that either or both of network device 2002 and/or network device 2004 is connected to a power source, such as a mains electricity source. Thus, the network device 2002 or 2004 that is connected to the power source has the primary induction coil 2010 or 2012, while the other network device 2002 or 2004 has the secondary induction coil 2010 or 2012. In this embodiment, inductive charging is used, such that an electromagnetic field is used to transfer energy from the primary induction coil to the secondary induction coil. In this instance, it is not necessary for both network device 2002 and network device 2004 to be connected to the power source; it is only necessary that the device having the primary induction coil be connected to the power source. Then, energy is transferred from the primary induction coil to the secondary induction coil, allowing configuration information to be transferred via direct communications link 2009 from one network device to the other, without both devices being connected to a wall socket.

Figure 21:
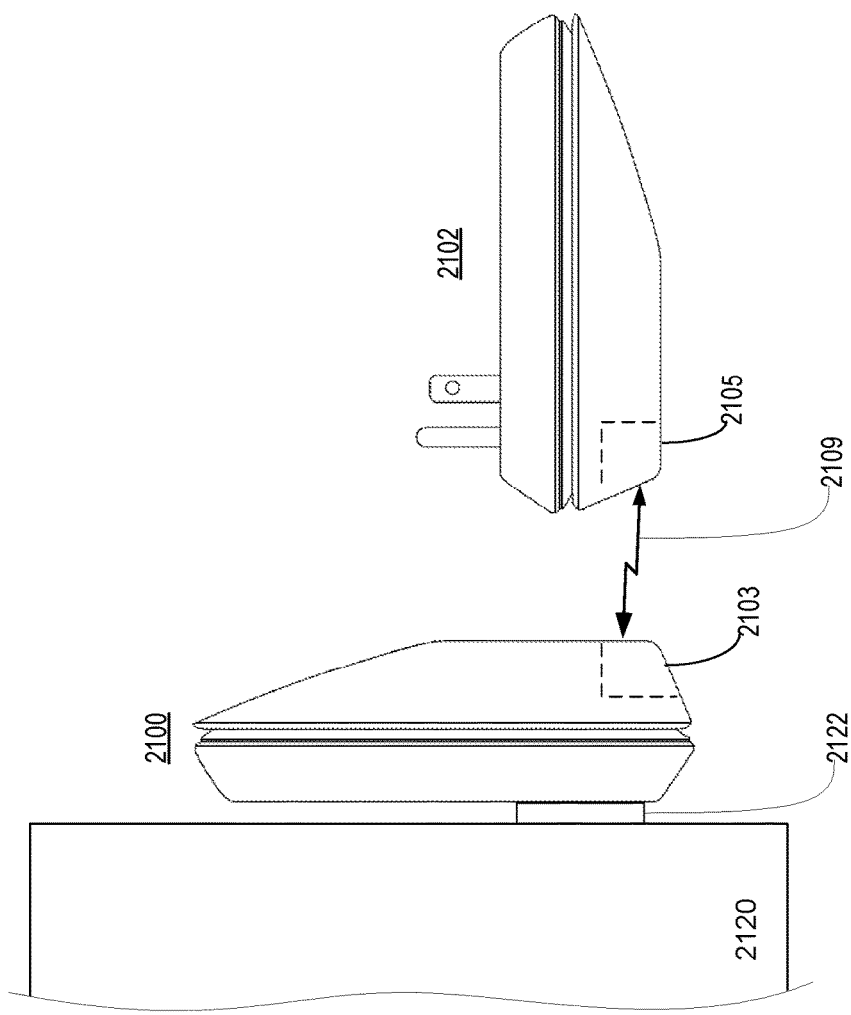
FIG. 21 is an illustration of an example of a side view of network devices, in accordance with an embodiment.

FIG. 21 is an illustration of an example of a side view of network devices 2100 and 2102, in accordance with an embodiment. The network devices 2100 and 2102 may include any of the network devices 102, 104, 106, or 1000 described herein. The network device 2100 is plugged in to a wall socket 2122 in the wall 2120, such as a socket providing 120V, 220V, or the like.

Once it is plugged in, the radio frequency communication device 2103 of the network device 2100, which has been previously configured according to the methods described above, directly communicates with the radio frequency communication device 2105 of unplugged network device 2102 via direct communications link 2109. Through the use of induction coils, batteries, or the like, it is not necessary for the network device 2102 to be plugged into the wall socket 2122 in order to have configuration information transferred from the network device 2100 to the network device 2102. Once network device 2102 is configured, it may then be used to configure other network devices in direct communication range in a similar manner to that described above.

Figure 22:
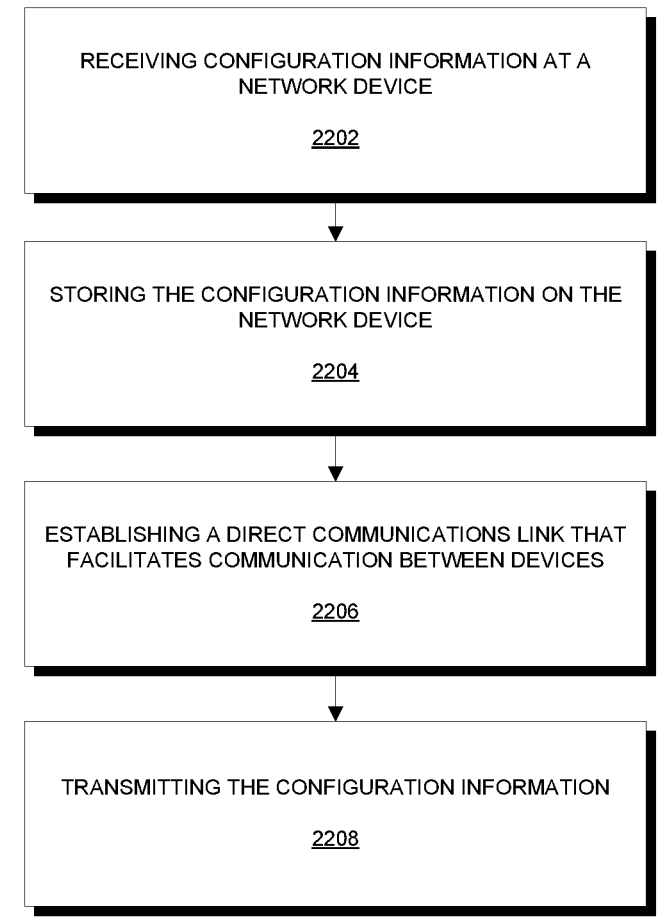
FIG. 22 is a flow chart illustrating a method for configuring a network device, in accordance with an embodiment.

FIG. 22 is a flow chart 2200 illustrating a method for configuring a network device according to one embodiment. The network device may include any of the network devices 102, 104, 106, or 1302 described herein.

At block 2202, a network device receives configuration information, such as wireless network access information (e.g., an SSID network name, SSID password, network device username, and/or network device password). In one embodiment, the identity of the network device is verified prior to receiving configuration information at the network device. The identity of the network device may be verified using, for example, a software identification module or a hardware identification chip. The network device may communicate its identification information as established by the software identification module or hardware identification chip to the cloud network 114. The identity of the network device may be verified by comparing the identification information to a database of known authentic network devices.

At block 2204, the configuration information is stored on the network device. The configuration information may be stored in non-transitory memory, such as, for example, flash memory 1220 and/or the DRAM 1222, as described above with respect to FIG. 12.

Referring back to FIG. 22, a direct communications link is established that facilitates communication between network devices at block 2206. The direct communications link may be established using radio frequency communication technology, such as near field communication (NFC) technology, Bluetooth™ technology, or Bluetooth™ low energy technology. Facilitating communication between network devices may include powering a receiver, such as by a transmitter of the network device, using induction coils as described above with respect to FIG. 20, or other suitable means. In one embodiment, the transmitter may be removed from a power source of the network device and be positioned adjacent to other network devices to establish the direct communications link. At block 2208, the configuration information is transmitted from the network device using the direct communications link.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

As used below, any reference to a series of examples is to be understood as a reference to each of those examples disjunctively (e.g., "Examples 1-4" is to be understood as "Examples 1, 2, 3, or 4").

Example 1 is a method for configuring a network device. The method comprises: receiving configuration information at a network device; storing the configuration information on the network device; establishing a direct communications link that facilitates communication between devices; and transmitting the configuration information, wherein the configuration information is transmitted using the direct communications link.

Example 2 is the method of Example 1, wherein facilitating communication between devices includes powering a receiver.

Example 3 is the method of Examples 1 or 2, wherein the receiver is powered by a transmitter.

Example 4 is the method of Examples 1-3, wherein transmitting the configuration information includes transmitting wireless network access information.

Example 5 is the method of Examples 1-4, wherein devices include unpowered devices.

Example 6 is the method of Examples 1-5, wherein establishing the direct communications link includes removing a transmitter from a power source of the network device, wherein the transmitter is capable of being positioned adjacent to powered devices to establish the direct communications link.

Example 7 is the method of Examples 1-6, further comprising verifying an identity of the network device prior to receiving configuration information at the network device.

Example 8 is the method of Examples 1-7, wherein the network device includes non-transitory memory, and wherein the configuration information is stored in the non-transitory memory and transmitted from the non-transitory memory.

Example 9 is a system for configuring a network device. The system comprises: one or more data processors; and a non-transitory computer-readable storage medium containing instructions which when executed on the one or more data processors, cause the one or more data processors to perform operations including: receiving configuration information at a network device; storing the configuration information on the network device; establishing a direct communications link that facilitates communication between devices; and transmitting the configuration information, wherein the configuration information is transmitted using the direct communications link.

Example 10 is the system of Example 9, wherein facilitating communication between devices includes powering a receiver.

Example 11 is the system of Examples 9 or 10, wherein the receiver is powered by a transmitter.

Example 12 is the system of Examples 9-11, wherein transmitting the configuration information includes transmitting wireless network access information.

Example 13 is the system of Examples 9-12, wherein devices include unpowered devices.

Example 14 is the system of Examples 9-13, wherein establishing the direct communications link includes: removing a transmitter from a power source of the network device, wherein the transmitter is capable of being positioned adjacent to powered devices to establish the direct communications link.

Example 15 is the system of Examples 9-14, further comprising instructions which when executed on the one or more data processors, cause the one or more data processors to perform operations including: verifying an identity of the network device prior to receiving configuration information at the network device.

Example 16 is the system of Examples 9-15, wherein the network device includes non-transitory memory, and wherein the configuration information is stored in the non-transitory memory and transmitted from the non-transitory memory.

Example 17 is a computer-program product tangibly embodied in a non-transitory machine-readable storage medium. The machine-readable storage medium includes instructions configured to cause a data processing apparatus to perform operations for configuring a network device. The operations comprise: receiving configuration information at a network device; store the configuration information on the network device; establishing a direct communications link that facilitates communication between devices; and transmitting the configuration information, wherein the configuration information is transmitted using the direct communications link.

Example 18 is the computer-program product of Example 17, wherein facilitating communication between devices includes powering a receiver.

Example 19 is the computer-program product of Examples 17 or 18, wherein the receiver is powered by a transmitter.

Example 20 is the computer-program product of Examples 17-19, wherein transmitting the configuration information includes transmitting wireless network access information.

Example 21 is the computer-program product of Examples 17-20, wherein devices include unpowered devices.

Example 22 is the computer-program product of Examples 17-21, wherein establishing the direct communications link includes removing a transmitter from a power source of the network device, wherein the transmitter is capable of being positioned adjacent to powered devices to establish the direct communications link.

Example 23 is the computer-program product of Examples 17-22, wherein the instructions are further configured to cause the data processing apparatus to verify an identity of the network device prior to receiving configuration information at the network device.

Example 24 is the computer-program product of Examples 17-23, wherein the network device includes non-transitory memory, and wherein the configuration information is stored in the non-transitory memory and transmitted from the non-transitory memory.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
   receiving, at a server, a communication including a unique identifier for an access device connected to a network, wherein the network is connected to a network device, and wherein an operation of the network device is controllable by the access device;
   generating a network fingerprint that uniquely identifies the network, wherein the network fingerprint is generated using a configuration or pattern of device connections associated with the network, and wherein a network fingerprint is associated with a unique identifier for an access device;
   transmitting the network fingerprint;
   receiving an additional communication, wherein the additional communication corresponds to a request to control the operation of the network device, wherein the additional communication includes the network fingerprint, and wherein when the additional communication is received from the access device, the additional communication includes the unique identifier for the access device;
   determining whether the network fingerprint is associated with the unique identifier for the access device; and
   facilitating control of the operation of the network device by the access device when the network fingerprint is associated with the unique identifier, wherein the access device is enabled to control the operation of the network device without having to provide a login credential.

2. The method of claim 1, wherein the unique identifier is a hardware address of the network device.

3. The method of claim 2, wherein the hardware address is a media access control address of the network device.

4. The method of claim 1, wherein the network device is associated with network device properties, and wherein the network device properties include a device type, a device manufacturer, or a logical name.

5. The method of claim 1, further comprising:
   determining a transience level of the network device, wherein determining includes determining the transience level using network device properties associated with the network device; and
   assigning a weight to the network device based on the transience level, wherein the network fingerprint includes an indication of the weight.

6. The method of claim 1, further comprising:
   obtaining additional unique identifiers, wherein each additional unique identifier is associated with an additional network device connected to the network;
   using the additional unique identifiers to determine properties for each of the additional network devices; and
   updating the network fingerprint to include an indication of the properties of the additional network devices.

7. The method of claim 1, further comprising:
   periodically polling the network to determine a change in the network, wherein the change includes a connection of a new network device, a disconnection of an additional network device, or a change in a gateway in the network; and
   updating the network fingerprint.

8. The method of claim 1, wherein when the network fingerprint is received, the network fingerprint facilitates determining changes to the network over time, wherein determining includes comparing the network fingerprint to one or more previously transmitted network fingerprints.

9. The method of claim 1, wherein when the network fingerprint is received at a cloud-based service, the network fingerprint facilitates registering the network device with the cloud-based service.

10. The method of claim 1, wherein the network fingerprint includes a hash value.

11. A system, comprising:
    one or more data processors; and
    a non-transitory computer-readable storage medium containing instructions which when executed on the one or more data processors, cause the one or more processors to perform operations including:
      receiving, at a server, a communication including a unique identifier for an access device connected to a network, wherein the network is connected to a network device, and wherein an operation of the network device is controllable by the access device;
      generating a network fingerprint that uniquely identifies the network, wherein the network fingerprint is generated using a configuration or pattern of device connections associated with the network, and wherein a network fingerprint is associated with a unique identifier for an access device;
      transmitting the network; fingerprint;
      receiving an additional communication, wherein the additional communication corresponds to a request to control the operation of the network device, wherein the additional communication includes the network fingerprint, and wherein when the additional communication is received from the access device, the additional communication includes the unique identifier for the access device;
      determining whether the network fingerprint is associated with the unique identifier for the access device; and
      facilitating control of the operation of the network device by the access device when the network fingerprint is associated with the unique identifier, wherein the access device is enabled to control the operation of the network device without having to provide a login credential.

12. The system of claim 11, further comprising instructions which when executed on the one or more data processors, cause the one or more processors to perform operations including:
   determining a transience level of the network device, wherein determining includes determining the transience level using network device properties associated with the network device; and
   assigning a weight to the network device based on the transience level, wherein the network fingerprint includes an indication of the weight.

13. The system of claim 11, further comprising instructions which when executed on the one or more data processors, cause the one or more processors to perform operations including:
   obtaining additional unique identifiers, wherein each additional unique identifier is associated with an additional network device connected to the network;
   using the additional unique identifiers to determine properties for each of the additional network devices; and
   updating the network fingerprint to include an indication of the properties of the additional network devices.

14. The system of claim 11, further comprising instructions which when executed on the one or more data processors, cause the one or more processors to perform operations including:
   periodically polling the network to determine a change in the network, wherein the change includes a connection of a new network device, a disconnection of an additional network device, or a change in a gateway in the network; and
   updating the network fingerprint.

15. The system of claim 11, wherein the unique identifier is a hardware address of the network device.

16. The system of claim 11, wherein when the network fingerprint is received at a cloud-based service, the network fingerprint facilitates:
   registering the network device with the cloud-based service; and
   determining changes to the network over time, wherein determining includes comparing the network fingerprint to one or more previously transmitted network fingerprints.

17. A computer-program product tangibly embodied in a non-transitory machine-readable storage medium of a computing device, including instructions configured to cause one or more data processors to:
   receive a communication including a unique identifier for an access device connected to a network, wherein the network is connected to a network device, and wherein an operation of the network device is controllable by the access device;
   generate a network fingerprint that uniquely identifies the network, wherein the network fingerprint is generated using a configuration or pattern of device connections associated with the network, and wherein a network fingerprint is associated with a unique identifier for an access device;
   transmitting the network fingerprint;
   receiving an additional communication, wherein the additional communication corresponds to a request to control the operation of the network device, wherein the additional communication includes the network fingerprint, and wherein when the additional communication is received from the access device, the additional communication includes the unique identifier for the access device;
   determining whether the network fingerprint is associated with the unique identifier for the access device; and
   facilitating control of the operation of the network device by the access device when the network fingerprint is associated with the unique identifier, wherein the access device is enabled to control the operation of the network device without having to provide a login credential.

18. The computer-program product of claim 17, further comprising instructions configured to cause the one or more data processors to:
   determine a transience level of the network device, wherein determining includes determining the transience level using network device properties associated with the network device; and
   assign a weight to the network device based on the transience level, wherein the network fingerprint includes an indication of the weight.

19. The computer-program product of claim 17, further comprising instructions configured to cause the one or more data processors to:
   obtain additional unique identifiers, wherein each additional unique identifier is associated with an additional network device connected to the network;
   use the additional unique identifiers to determine properties for each of the additional network devices; and
   update the network fingerprint to include an indication of the properties of the additional network devices.

20. The computer-program product of claim 17, wherein when the network fingerprint is received at a cloud-based service, the network fingerprint facilitates:
   registering the network device with the cloud-based service; and
   determining changes to the network over time, wherein determining includes comparing the network fingerprint to one or more previously transmitted network fingerprints.

* * * * *

UNITED STATES PATENT AND TRADEMARK OFFICE
CERTIFICATE OF CORRECTION

PATENT NO. : 10,231,268 B2
APPLICATION NO. : 14/959192
DATED : March 12, 2019
INVENTOR(S) : Venkata Subba Rao Pathuri et al.

It is certified that error appears in the above-identified patent and that said Letters Patent is hereby corrected as shown below:

In the Claims

Column 54, Line 52, Claim 11: replace 'network;' with --network--

Signed and Sealed this
Fourteenth Day of April, 2020

Andrei Iancu
*Director of the United States Patent and Trademark Office*